US010460272B2

(12) United States Patent
Shukla et al.

(10) Patent No.: US 10,460,272 B2
(45) Date of Patent: Oct. 29, 2019

(54) CLIENT SERVICES REPORTING

(71) Applicant: ACCENTURE GLOBAL SOLUTIONS LIMITED, Dublin (IE)

(72) Inventors: Arpan Shukla, Chennai (IN); Rajendra Prasad, Chennai (IN); M V Koushik, Chennai (IN); Chetan Belgur, Tumkur (IN); Senthilkumar Jeyachandran, Chennai (IN); Prabhu Rajan, Chennai (IN)

(73) Assignee: ACCENTURE GLOBAL SOLUTIONS LIMITED, Dublin (IE)

( * ) Notice: Subject to any disclaimer, the term of this patent is extended or adjusted under 35 U.S.C. 154(b) by 385 days.

(21) Appl. No.: 15/149,655

(22) Filed: May 9, 2016

(65) Prior Publication Data
US 2017/0249570 A1 Aug. 31, 2017

(30) Foreign Application Priority Data
Feb. 25, 2016 (IN) .............................. 201641006500

(51) Int. Cl.
*G06Q 10/06* (2012.01)
*G06Q 50/00* (2012.01)
(Continued)

(52) U.S. Cl.
CPC ....... *G06Q 10/0639* (2013.01); *G06Q 10/103* (2013.01)

(58) Field of Classification Search
CPC ............ G06Q 10/00–99/00; H04L 1/00–69/00
(Continued)

(56) References Cited

U.S. PATENT DOCUMENTS 7,827,206 B2 * 11/2010 Holmes ................. G06Q 10/06
707/802
8,311,880 B1 * 11/2012 Zabriskie ............... G06Q 10/06
705/7.39
(Continued)

FOREIGN PATENT DOCUMENTS

CA 2386788 A1 * 4/2001 ............. G06Q 10/06

OTHER PUBLICATIONS

Watson, Hugh & Wixom, Barb. (2007). The Current State of Business Intelligence. Computer. 40. 96-99. 10.1109/MC.2007.331. (Year: 2007).*
(Continued)

*Primary Examiner* — Alan S Miller
*Assistant Examiner* — Jay-Ming Wang
(74) *Attorney, Agent, or Firm* — Mannava & Kang, P. C.

(57) ABSTRACT

According to examples, client services reporting may include ascertaining a line of business related to a report, ascertaining an application related to the line of business, and performing, based on the line of business and the application, a master setup of the report, and including, in the report, a field related to an executive summary, application maintenance metrics data, change management information, resourcing information, and/or business line performance information. Client services reporting may further include generating the report, ascertaining a confirmation status of the report, and submitting, based on the ascertained confirmation status of the report, the report for approval by a specified entity. Further, client services reporting may include ascertaining, based on the submittal of the report for approval by the specified entity, whether the report is approved or disapproved, and publishing the report based on the approval of the report.

15 Claims, 29 Drawing Sheets

(51) Int. Cl.
*G06F 17/27* (2006.01)
*G06Q 10/10* (2012.01)

(58) Field of Classification Search
USPC .............................................. 705/7.11, 7.42
See application file for complete search history.

(56) References Cited

U.S. PATENT DOCUMENTS

| | | | |
|---|---|---|---|
| 8,380,588 B2 | 2/2013 | Batra et al. | |
| 2010/0106541 A1 | 4/2010 | Upadhyaya et al. | |
| 2013/0111321 A1* | 5/2013 | Dorrell | G06F 9/44 |
| | | | 715/215 |
| 2014/0013218 A1* | 1/2014 | Lu | G06F 17/243 |
| | | | 715/255 |
| 2014/0129366 A1* | 5/2014 | Mudhar | G06Q 50/167 |
| | | | 705/26.4 |
| 2015/0032685 A1* | 1/2015 | Lingappa | G06Q 10/063 |
| | | | 707/603 |

OTHER PUBLICATIONS

"Vermilion Reporting Suite", material from the site www.vermilionsoftware.com/, Year of publication being 2008 and 2011 as per Wayback Machine. Retrieved from internet on Apr. 7, 2017, 61 pages.

* cited by examiner

US 10,460,272 B2

CLIENT SERVICES REPORTING

PRIORITY

The present application claims priority to Indian patent application number 201641006500, having a filing date of Feb. 25, 2016, the disclosure of which is hereby incorporated by reference in its entirety.

BACKGROUND

A report may be described as any informational work made with the intention of relaying information or recounting events in a presentable form. For example, the information work may include writings, speech, graphs, etc. A report may be used, for example, by a service provider to provide information to another entity (e.g., a client) in a format that is relevant to the entity.

BRIEF DESCRIPTION OF DRAWINGS

Features of the present disclosure are illustrated by way of examples shown in the following figures. In the following figures, like numerals indicate like elements, in which.

DETAILED DESCRIPTION

Figure 1:
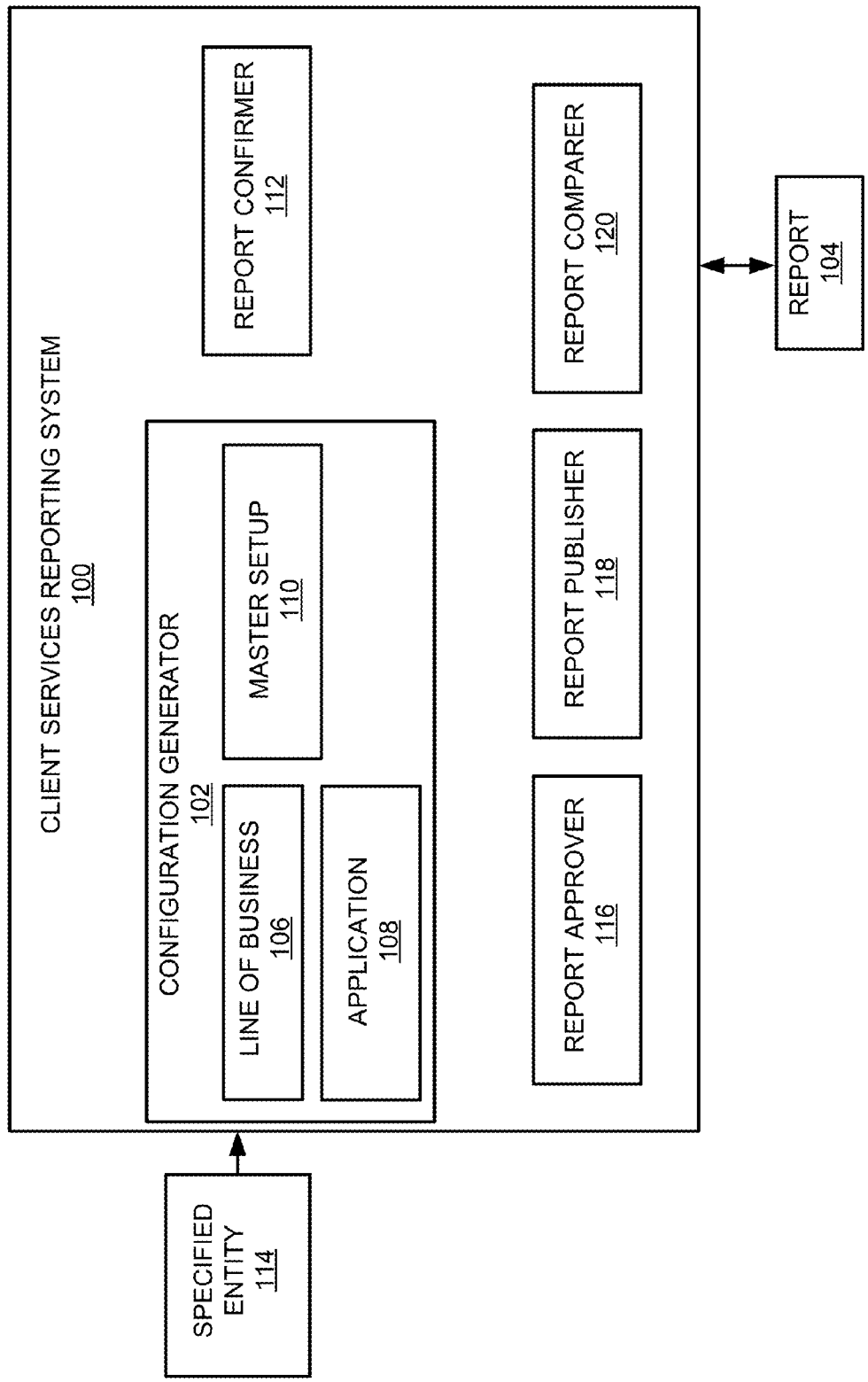
FIG. 1 illustrates a client services reporting system, according to an example of the present disclosure.

For simplicity and illustrative purposes, the present disclosure is described by referring mainly to examples thereof. In the following description, numerous specific details are set forth in order to provide a thorough understanding of the present disclosure. It will be readily apparent however, that the present disclosure may be practiced without limitation to these specific details. In other instances, some methods and structures have not been described in detail so as not to unnecessarily obscure the present disclosure.

Throughout the present disclosure, the terms "a" and "an" are intended to denote at least one of a particular element. As used herein, the term "includes" means includes but not limited to, the term "including" means including but not limited to. The term "based on" means based at least in part on.

According to examples, a client services reporting system and a method for client services reporting are disclosed herein. According to examples, the system and method disclosed herein may provide a tolling solution which may be accessed, for example, from any browser across the globe, and allows users to visualize status report and a health of their project. The tolling solution may produce accurate and timely reports that are readily understandable and are provided in a predetermined pictorial format. According to examples, the system and method disclosed herein may provide users with a front end to design and customize a status report (i.e., content, and format of the status report). In this regard, the system and method disclosed herein may provide for customized metrics that are designed to track status and health of a project or work, configurability at project level to select which reports/data to view, a limited number of inputs in the form of measures and metrics that are provided with reports that are generated based on predefined formats and structure, customized report formats and presentations designed to provide user-specific reports, and reports that are designed to address status reporting related challenges. Further, the system and method disclosed herein may provide status reports, based, for example, on client priorities, and publish periodic status reports with approved workflow to clients.

According to examples, with respect to report generation, the system and method disclosed herein may provide for the setting of a correct project type to collect data for a report to be generated based on metrics (which may be standardized) associated with the project type, automation with respect to report creation, customization of a report, and generation of a status report based on the project type and the customization. The system and method disclosed herein may provide reports based, for example, on different work types (e.g., system integration work vs. application outsourcing vs. testing work). In this regard, the system and method disclosed herein may provide for generation of reports based on specific type of data inputs, determination of report data based on the data inputs, and generation of reports based on the report data. The status reports may provide indicators of productivity for comparison purposes.

The system and method disclosed herein may provide insight beyond demonstration of meeting service commitments, and drive additional value creation through improved quality and speed of operational decision making to implement corrective actions. In this regard, the system and method disclosed herein may facilitate visibility and control of a particular line of business (LOB) through mobility and analytics.

According to examples, the system disclosed herein may represent an integrated high performance service management reporting system. According to examples, the system and method disclosed herein may include features that provide for the configuration, review, approval, and/or publishing of reports, setting of client service level agreements (SLAs) and contractual targets, and comparison of LOBs and applications, to provide a snapshot of applications/LOBs to a user (e.g., a client). According to examples, the system and method disclosed herein may be used for configuring reports with a specific frequency, for review of reports, approval of reports, and for publishing of a confirmed report to a user (e.g., a client) for every application under a particular LOB.

According to examples, the system and method disclosed herein may provide for role based access, for example, for a visitor (e.g., read only access), for a delivery lead (DL), a project manager (PM), a project management office (PMO), user, client, etc. According to examples, the system and method disclosed herein may provide for the configuration of a report based on the requirements specific to projects, which include confirmation (e.g., preview of the configuration) and approval by a DL. According to examples, the system and method disclosed herein may provide for the publishing of reports with different frequencies (e.g., weekly, fortnightly, monthly, quarterly, etc.). According to examples, the system and method disclosed herein may provide visibility to pending actions on a report, for example, on a landing page. According to examples, the system and method disclosed herein may provide feasibility to map a sourcing approach for performance indicators, along with manual sourcing. According to examples, the system and method disclosed herein may include the functionality to set user (e.g., client) SLAs and contractual targets for metrics. According to examples, the system and method disclosed herein may provide for the generation of a graphical representation for every performance indicator, for example, in forms such as area, bar, line, pie graph, etc. According to examples, the system and method disclosed herein may provide for the validation and confirmation of reports before publishing, for example, to a user (e.g., client). According to examples, the system and method disclosed herein may provide for comparison of parameters with different LOB/applications parameters.

According to examples, the system and method disclosed herein may provide the infrastructure to configure a report based on project and client requirements. According to examples, the system and method disclosed herein may provide for automated sourcing of data from an application outsourcing (AO) analytics engine for application management (AM). According to examples, the system and method disclosed herein may include an in-built approval process and facility to publish reports with different frequencies (e.g., weekly, fortnightly, monthly, quarterly, etc.). According to examples, the system and method disclosed herein may provide for the definition of project specific sections and metrics for application development, application management, and testing. According to examples, the system and method disclosed herein may include Internet features to provide for high user interactions, and include export functionality. According to examples, the system and method disclosed herein may provide comprehensive reporting based on the scope of work (e.g., application development, application management, and/or testing). According to examples, the system and method disclosed herein may provide for the generation of report outputs in the form of online reports in specified formats (e.g., PDF format). According to examples, the system and method disclosed herein may be implemented on a mobile device, such as a tablet, a phone, etc.

According to examples, the system and method disclosed herein may include a single reporting system for application development, application management, and/or testing metrics for clients. According to examples, the system and method disclosed herein may provide for the configuration of application development, application management, and/ or testing sections/metrics as per client key performance indicators (KPIs). According to examples, the system and method disclosed herein may provide for a user to report metrics at release level and application level for application development and testing scope of work. According to examples, the system and method disclosed herein may provide manual and/or file based (e.g., Excel based) upload data entry of metrics for application development, application management, and/or testing. According to examples, the system and method disclosed herein may provide for the validation and confirmation of reports before publishing to a client. According to examples, the system and method disclosed herein may provide for the comparison of parameters with different line of business and/or applications parameters.

The client services reporting system and the method for client services reporting disclosed herein provide a technical solution to technical problems related, for example, to report configuration, confirmation, approval, publishing, and/or comparison. As disclosed herein, the system and method disclosed herein provide the technical solution of a configuration generator that is executed by at least one hardware processor to configure a report that is to be generated by ascertaining a line of business related to the report, ascertaining an application related to the line of business, and performing, based on the line of business and the application, a master setup of the report. The master setup may include information related to a scope of services, a service model, a service level agreement description, a contract overview, and/or service management. The configuration generator may further include, in the report, a field related to an executive summary, application maintenance metrics data, change management information, resourcing information, and/or business line performance information. A report confirmer that is executed by the at least one hardware processor may confirm the configuration of the report and the report by generating the report, ascertaining a confirmation status of the report, and submitting, based on the ascertained confirmation status of the report, the report for approval by a specified entity. A report approver that is executed by the at least one hardware processor may ascertain, based on the submittal of the report for approval by the specified entity, whether the report is approved or disapproved. A report publisher that is executed by the at least one hardware processor may publish the report based on the approval of the report. A report comparer that is executed by the at least one hardware processor may compare a plurality of parameters of the report to parameters of a report for a different line of business and a different application, and generate a display of similarities and differences based on the comparison. According to examples, the system and method disclosed herein may provide standardization of the types of reports for a given type of project, a method of data collection, and generation of standardized reports based on the project type specific intelligence logic and custom metrics computation processes as disclosed herein. These custom metrics computation processes may facilitate governance of projects. According to examples, the system and method disclosed herein may provide a centralized location for data collection by using a standardized web-based user interface. According to examples, the system and method disclosed herein may provide for customized representation of data for reports. According to examples, the system and method disclosed herein may provide reduced response time with respect to report generation, increased report usability, customization and processing of reports, and configurability at project and project type levels.

FIG. 1 illustrates a client services reporting system 100 (e.g., system 100 as disclosed herein), according to an example of the present disclosure. Referring to FIG. 1, the system 100 may include a configuration generator 102, executed by at least one hardware processor (e.g., processor 2902), to configure a report 104 that is to be generated by ascertaining a line of business 106 related to the report 104, and ascertaining an application 108 related to the line of business 106. A line of business (LOB) may describe the products or services offered by a corporation or manufacturer (e.g., retail, finance, banking, etc.). A LOB application may be described as a container that holds all project tracking metrics information for tracking and status reporting purposes. The configuration generator 102 may perform, based on the line of business 106 and the application 108, a master setup 110 of the report 104. The master setup 110 may include information related to a scope of services, a service model, a service level agreement description, a contract overview, and/or service management. Further, the configuration generator 102 may include, in the report 104, a field related to an executive summary, application maintenance metrics data, change management information, resourcing information, and/or business line performance information. The executive summary may be described as a summary of a status of a project, for example, for executives and/or project owners. Application maintenance metrics data may be described as metrics data of a project associated with application maintenance type of work. Change management information may be described as information related to change requests. Resourcing information may be described as information related to resources that are working on a project. Business line performance information may be described as information based on metrics that define how a business is performing.

According to examples, the configuration generator 102 may perform, based on the line of business and the application, the master setup of the report 104 by performing, based on the line of business and the application, the master setup of the report 104 to include a publishing interval of the report.

According to examples, the configuration generator 102 may specify the scope of services, the service model, the service level agreement description, the contract overview, and the service management as mandatory fields of the report 104 that are unchangeable after completion of the configuration of the report 104.

According to examples, the configuration generator 102 may configure the report 104 that is to be generated by including the application maintenance metrics data that includes metrics derived from incident management, problem management, work request management, and/or application management. Incident management may be implemented to restore normal operations in an expedited manner with the least possible impact on either an organization or a user, and in a cost-effective manner. Problem management may be implemented to minimize both the number and severity of incidents and potential problems to an organization. Work request management may be implemented to manage requests from clients and internal users to log, track, and manage work. Application management may be implemented to manage the operation, maintenance, versioning, and upgrading of an application throughout its lifecycle.

According to examples, the configuration generator 102 may configure the report 104 that is to be generated by including the change management information that includes lower and upper control limits related to a graph included in the report 104.

According to examples, the configuration generator 102 may ascertain whether the report is approved or disapproved, and re-configure the report based on the disapproval of the report. For example, the configuration generator 102 may re-configure the entire report 104 based on the disapproval of the report 104.

A report confirmer 112 that is executed by the at least one hardware processor may confirm the configuration of the report 104 and the report 104 by generating the report 104, ascertaining a confirmation status of the report 104, and submitting, based on the ascertained confirmation status of the report, the report 104 for approval by a specified entity 114 (e.g., a delivery lead, project manager, etc.).

According to examples, the report confirmer 112 may confirm the configuration of the report 104 and the report 104 by submitting, based on the ascertained confirmation status of the report 104, the report 104 for approval by the specified entity 114 that includes the authority to approve or reject the report 104.

A report approver 116 that is executed by the at least one hardware processor may ascertain, based on the submittal of the report 104 for approval by the specified entity 114, whether the report is approved or disapproved.

A report publisher 118 that is executed by the at least one hardware processor may publish the report 104 based on the approval of the report 104.

According to examples, the report publisher 118 may publish the report 104 based on the approval of the report 104 by selection of a publish option that is available on a user-interface display specific to the specified entity 114.

A report comparer 120 that is executed by the at least one hardware processor may compare a plurality of parameters of the report 104 to parameters of a report for a different line of business and a different application, and generate a display of similarities and differences based on the comparison. Parameters may be ascertained and compared based on predefined targets, and by using, for example, a numeric comparison based technique. Further, the report comparer 120 may generate a display of the report 104 and a plurality of reports of similar line of businesses compared to the line of business, and/or similar applications compared to the application.

Figure 2:
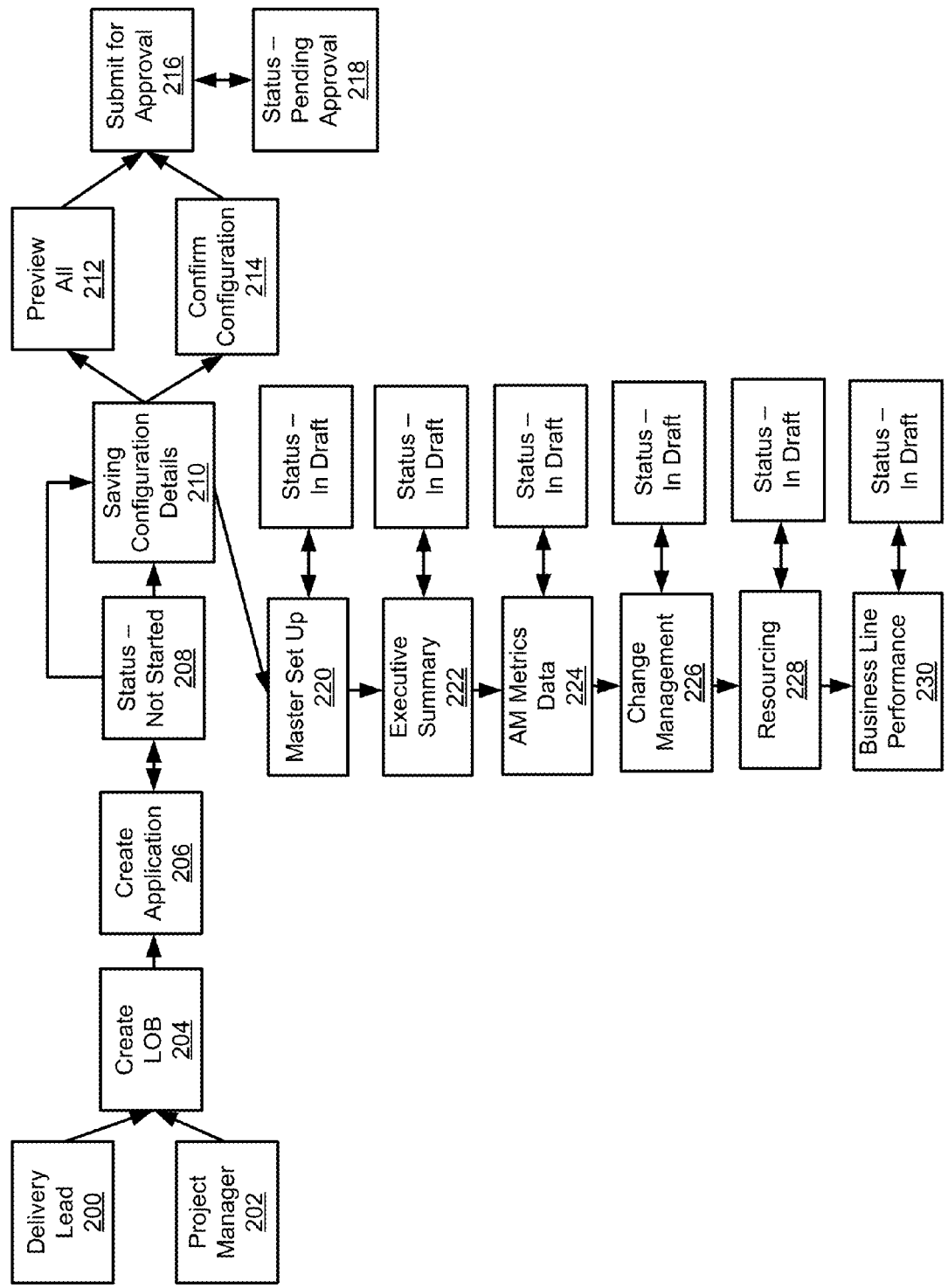
FIG. 2 illustrates a configuration flow for the client services reporting system of FIG. 1, according to an example of the present disclosure.

FIG. 2 illustrates a configuration flow for the system 100, according to an example of the present disclosure.

Referring to FIG. 2, at blocks 200 and 202, a delivery lead and/or a project manager (or another user) may create a line of business at 204. At block 206, an application that may be associated with the line of business may be created. An application may be described as a logical container, and may include any name, such as, for example, "fund Transfer system" etc. At block 208, the status may be indicated as not started, and at block 210, configuration details may be saved. At block 212, all information may be previewed with respect to the saved configuration details from block 210. At block 214, the configuration may be confirmed with respect to the saved configuration details from block 210. At block 216, the configuration details may be submitted (e.g., to a user, or an administrator otherwise) for approval. At block 218, the status of the configuration may be indicated as pending approval.

At block 220, the configuration flow may proceed to the master setup, where master details for report configuration (e.g., information sources, frequency, scope of work, etc.,) may be ascertained. At block 222, the configuration flow may proceed to the executive summary, where the executive summary for the report such as business highlights, issues, key actions, projects and initiatives, overall service, etc., may be captured. At block 224, the configuration flow may proceed to the application management metrics data which includes incident, problem, and work request metric details. At block 226, the configuration flow may proceed to change management which includes metric related to change requests. At block 228, the configuration flow may proceed to resourcing which includes metrics related resources that are working on a project. At block 230, the configuration flow may proceed to business line performance which includes metrics that define how a business is performing. The status of each of the blocks 220-220 may be provided, for example, as "in draft".

Figure 3:
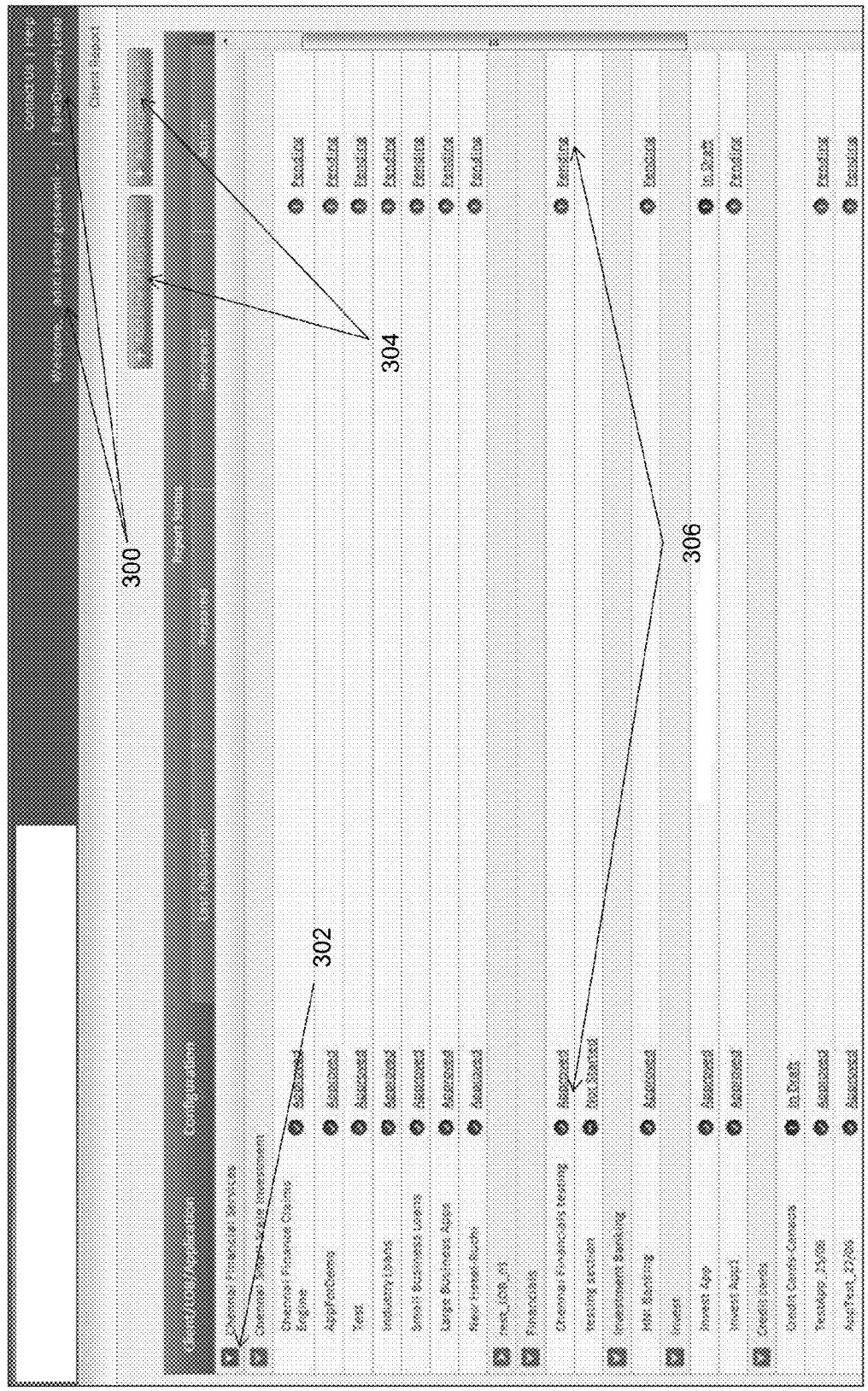
FIG. 3 illustrates a configuration user-interface display for the client services reporting system of FIG. 1, according to an example of the present disclosure.

FIG. 3 illustrates a configuration user-interface display for the system 100, according to an example of the present disclosure.

Referring to FIG. 3, as shown in the configuration user-interface display, a delivery lead and/or project manager may perform client and contract specific configuration. On the landing page, the delivery lead and/or project manager may view the list of clients, line of business, and applications for which they have access, view the next actions on the report, and add the line of business and application. For example, at 300, an enterprise identification and role assigned may displayed, for example, for a delivery lead. The role and identification may include a one to one mapping. Examples of roles may include delivery lead, project manager, project management office, client, visitor, etc. At 302, a user may click on a pyramid option at each level to view client, a particular line of business, application hierarchy, etc. At 304, a delivery lead and/or a project manager may add a line of business and/or application under a specific client to set configurations. At 306, configuration status and next set of actions on reports may be displayed on the homepage. Once the report configuration is approved, a user may commence report preparation based on the frequency selected in the master setup. Once the cycle is completed, the status of report preparation may be moved to pending for the next cycle.

Figure 4:
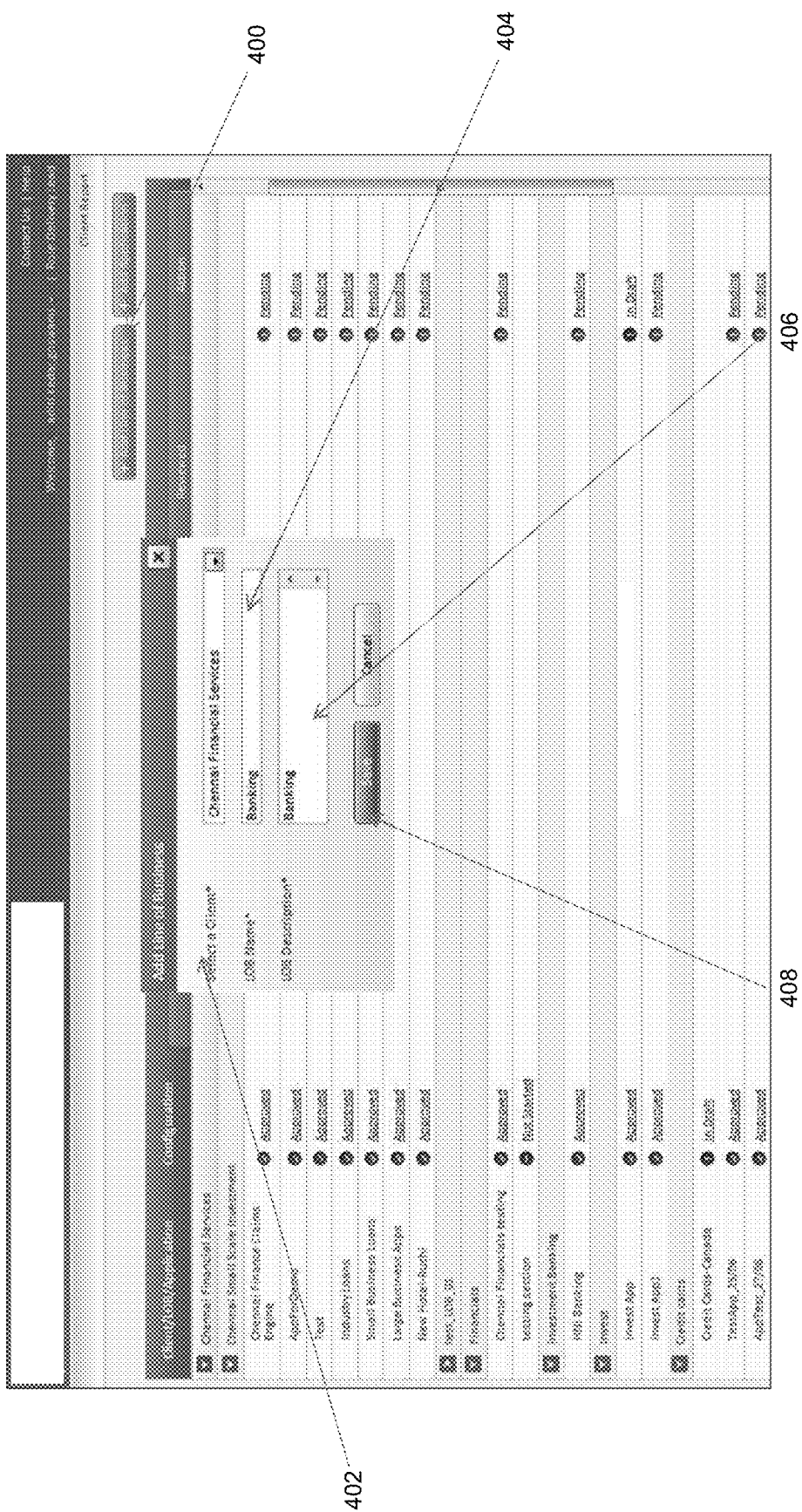
FIG. 4 illustrates a user-interface display for adding a line of business (LOB) with respect to configuration for the client services reporting system of FIG. 1, according to an example of the present disclosure.

FIG. 4 illustrates a user-interface display for adding a line of business with respect to configuration for the system 100, according to an example of the present disclosure. An LOB may be used to describe products or services that are offered, e.g., retail, finance, etc.

Referring to FIG. 4, as shown in the user-interface display for adding a line of business, a delivery lead and/or a project manager may add a line of business, for example, for a client, by selecting an "add line of business" option. A pop-up may appear with mandatory fields to be completed. For example, at 400, a delivery lead and/or a project manager may select an "add line of business" option. At 402, the pop-up may include an option to select a client to which a line of business is to be added. At 404, a line of business name may be provided, where the line of business name may be a unique name that is displayed in a report. At 406, a line of business description may be entered. At 408, a line of business may be created upon selection of a "save" option.

Figure 5:
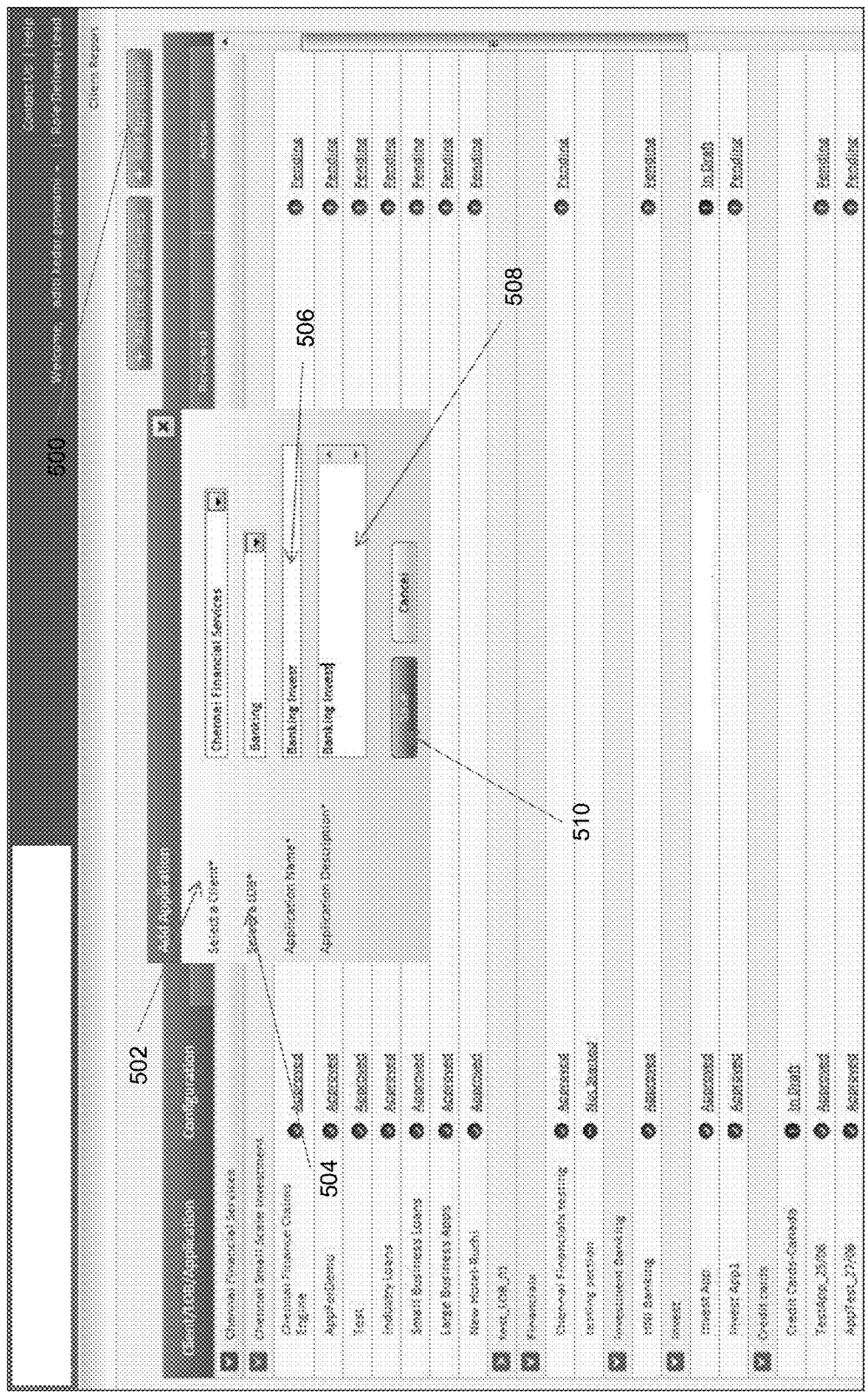
FIG. 5 illustrates a user-interface display for adding an application with respect to configuration for the client services reporting system of FIG. 1, according to an example of the present disclosure.

FIG. 5 illustrates a user-interface display for adding an application with respect to configuration for the system 100, according to an example of the present disclosure.

Referring to FIG. 5, as shown in the user-interface display for adding an application, a delivery lead and/or a project manager may add an application to the existing/newly created line of business by selecting on "add application" option. In this regard, a pop-up may appear with mandatory fields that are to be completed. For example, at 500, the delivery lead and/or project manager may select the option to add an application. At 502, a client may be selected. At 504, an existing line of business or newly created line of business may be selected under which a new application is to be added. At 506, a unique application name may be added (with the name being displayed in a report). At 508, an application description may be provided. At 510, an application may be created based on selection of a "save" option.

Figure 6:
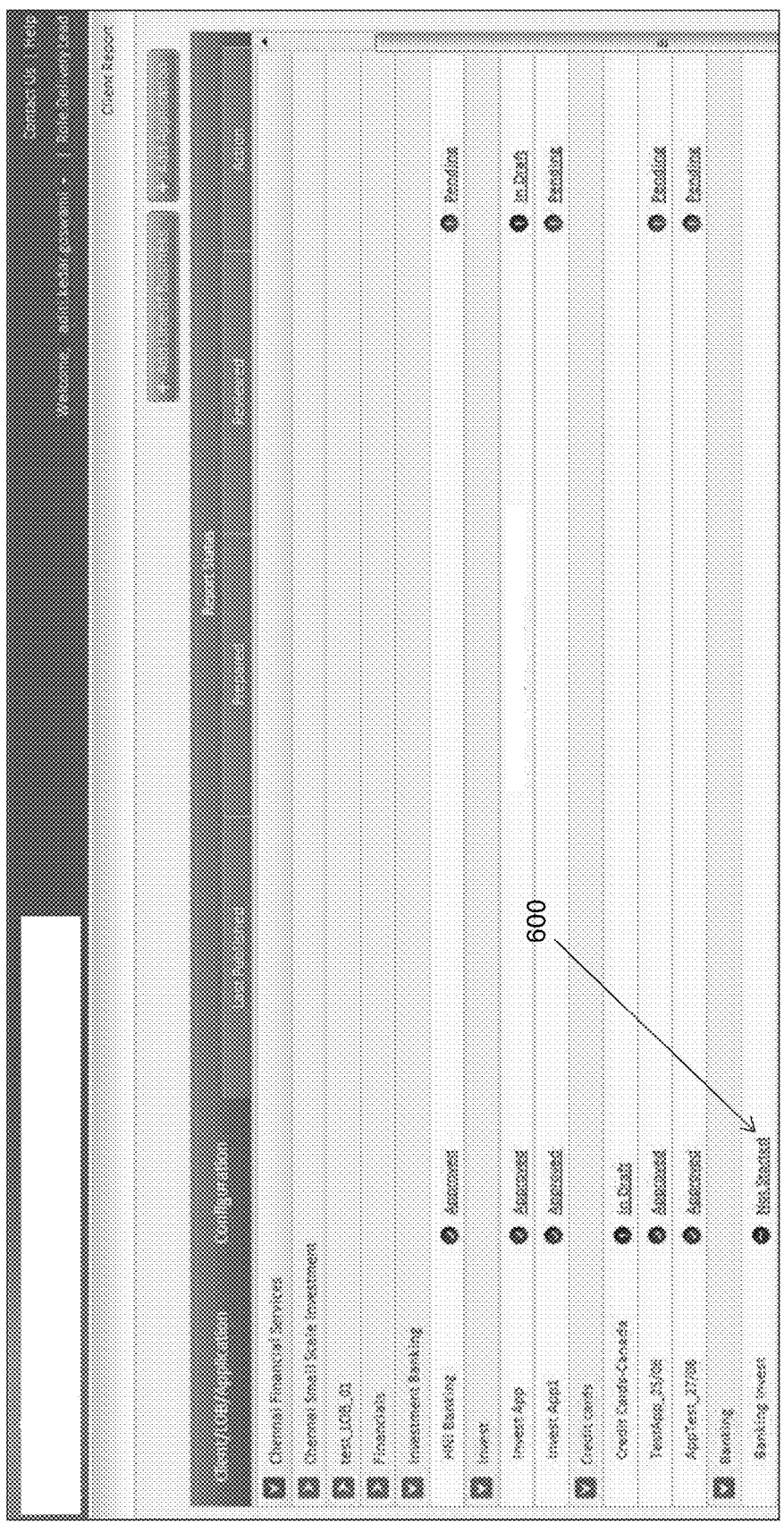
FIG. 6 illustrates a user-interface display for status with respect to configuration for the client services reporting system of FIG. 1, according to an example of the present disclosure.

FIG. 6 illustrates a user-interface display for status with respect to configuration for the system 100, according to an example of the present disclosure.

Referring to FIG. 6, as shown in the user-interface display for status, once the line of business and the application are created, the configuration status will be "not started". A user (e.g., a delivery lead and/or a project manager) may select a hyperlink of the configuration status, where processing may proceed to the configuration page where master setup and various parameters may need to be completed. For example, at 600, the configuration status of "not started" may be updated against the application name.

Figure 7:
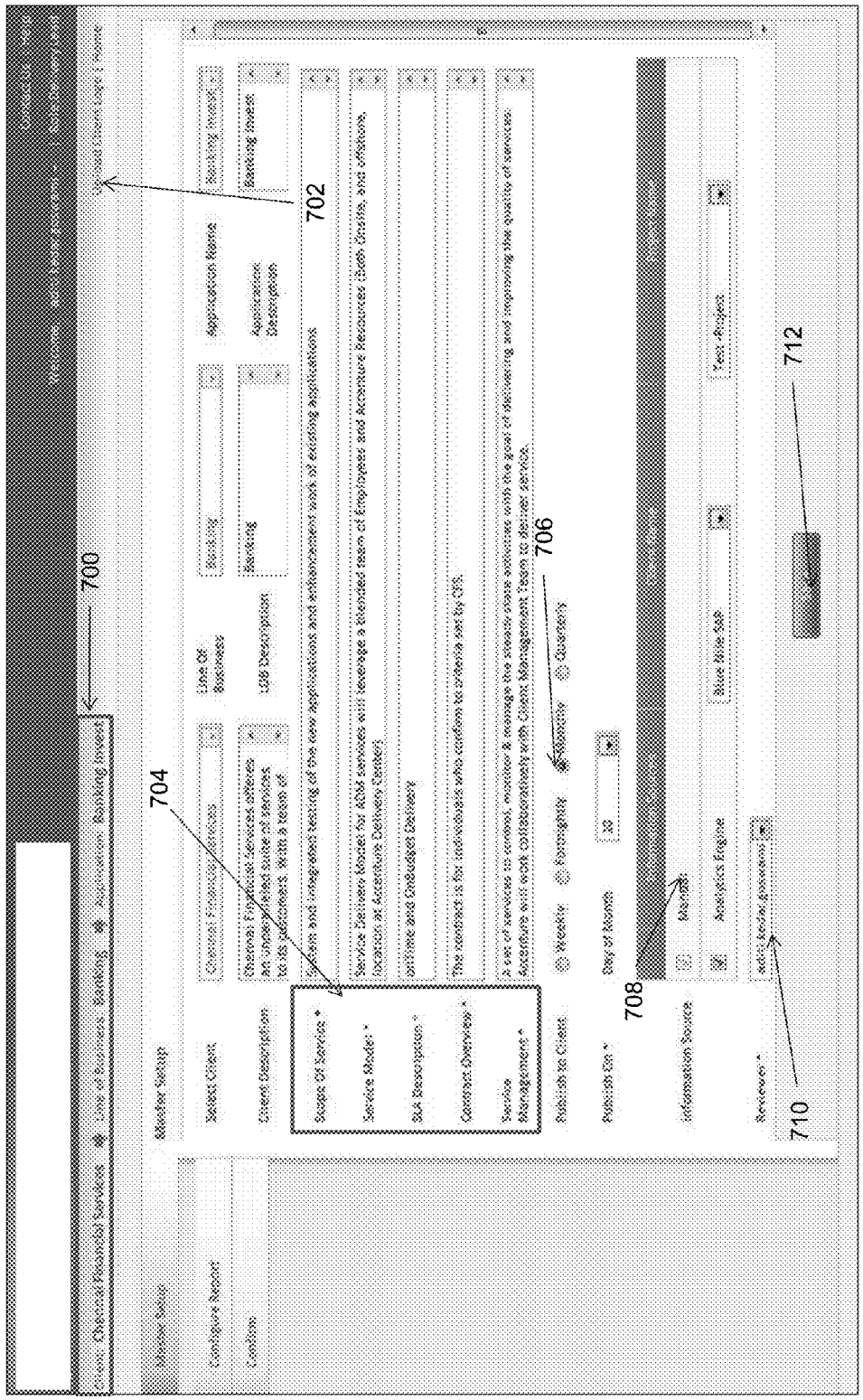
FIG. 7 illustrates a user-interface display for a master setup with respect to configuration for the client services reporting system of FIG. 1, according to an example of the present disclosure.

FIG. 7 illustrates a user-interface display for a master setup with respect to configuration for the system 100, according to an example of the present disclosure.

Referring to FIG. 7, as shown in the user-interface display for the master setup, the master setup may be described as a mandatory setup that is to be updated as per the client and contract configurations. The parameters with respect to the master setup, if applicable, may be completed and saved. Once the master setup is completed, the master setup may be editable for any user, and if any changes are needed, a ticket may be generated, for example, for an operations team. For example, at 700, the client, line of business, and application may be displayed. At 702, the client logo may be uploaded, for example, to a SharePoint by selecting an "upload client logo" link. At 704, the mandatory fields may be updated based on client and contract configuration. At 706, fortnightly may provide the option to choose a day in each fortnight the report will be published, monthly may provide the option to choose which day of the month the report will be published, and quarterly may provide the options to choose between which days in a quarter the report will be published. At 708, the sourcing approach (e.g., AOAE or manual) may be set, with manual sourcing being set by default, and when both AOAE and manual are selected, metrics data may be retrieved from AOAE and/or manually. AOAE data may be pushed through an automated process, and the AOAE data may be displayed on a user interface in the same manner manually entered data in shown. At 710, the enterprise identification of the reviewer who will review the report may be displayed as shown. Further, at 712, the master setup may be saved by selection of the "save" option, and any changes post saving may be performed through a backend.

Figure 8:
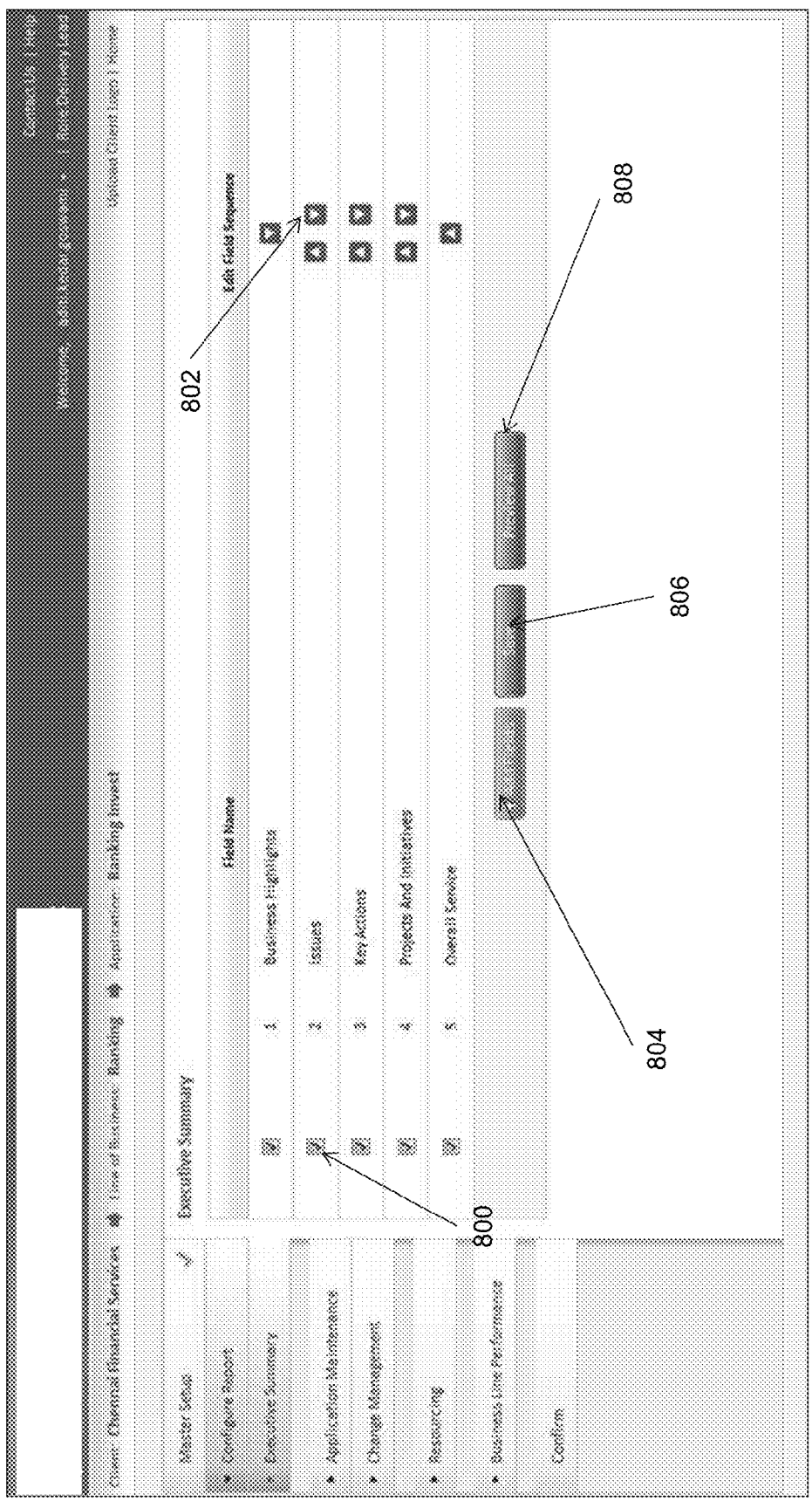
FIG. 8 illustrates a user-interface display for an executive summary with respect to configuration for the client services reporting system of FIG. 1, according to an example of the present disclosure.

FIG. 8 illustrates a user-interface display for an executive summary with respect to configuration for the system 100, according to an example of the present disclosure.

Referring to FIG. 8, as shown in the user-interface display for the executive summary, for the executive summary (under configure report), a plurality (e.g., five) fields may be selected by default. A delivery lead and/or a project manager may uncheck any one field from the list, and that field may not be included in the report. New fields may be added to track the progress related, for example, to a line of business. Further, the display order of fields may be changed based on the priority. For example, at 800, the fields may be included or discarded by checking or un-checking the illustrated box. At 802, the order in which the section needs to be displayed may be specified. At 804, new fields may be added by selecting an "add fields" option. At 806, the "save" option may be selected to save the changes, and for display of various fields in the report. At 808, the "preview all" option may be selected to view the preview of the report. The "preview all" option may fetch data from the database, and generate reports preview dynamically.

Figure 9:
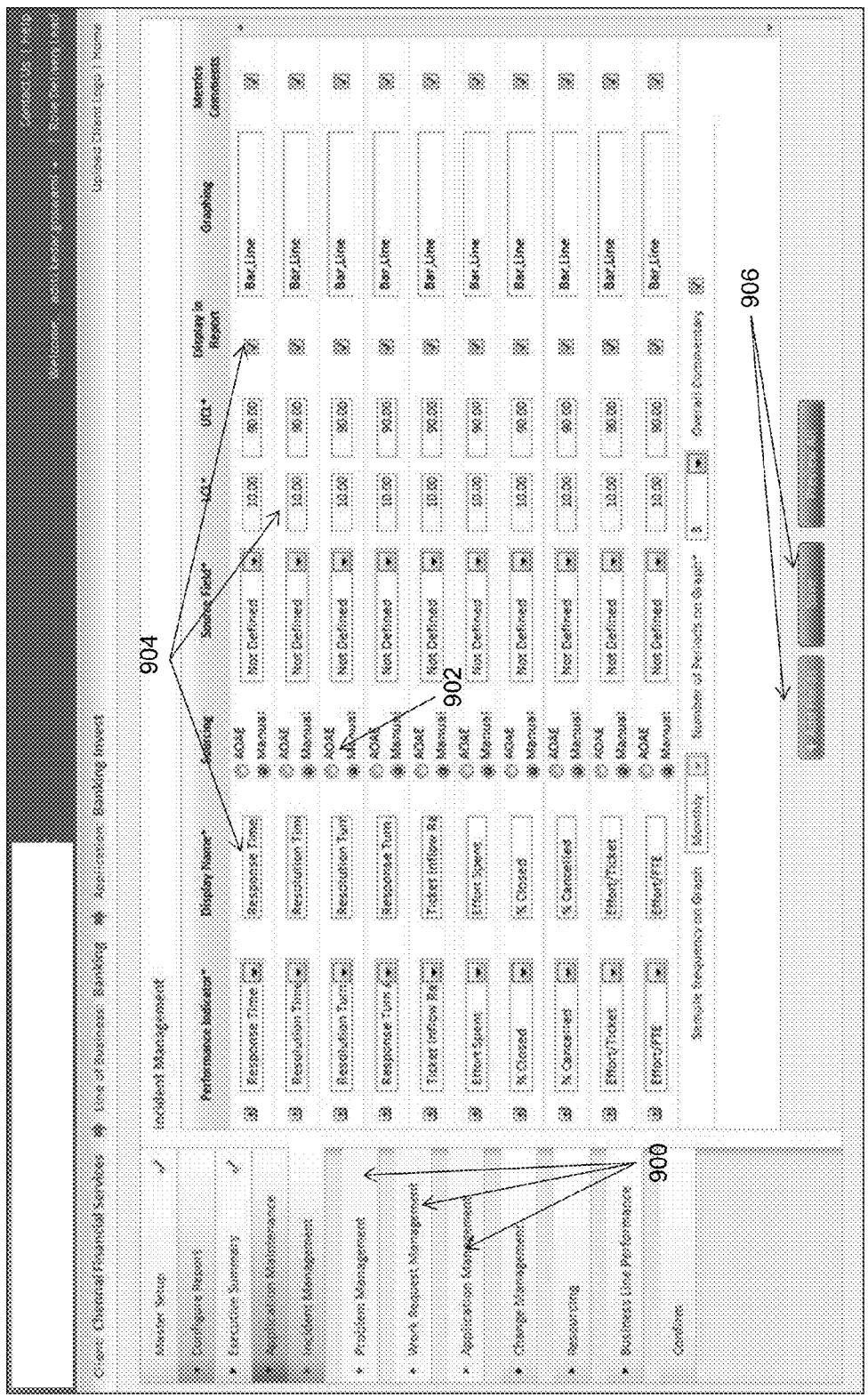
FIG. 9 illustrates a user-interface display for application maintenance metrics data with respect to configuration for the client services reporting system of FIG. 1, according to an example of the present disclosure.

FIG. 9 illustrates a user-interface display for application maintenance metrics data with respect to configuration for the system 100, according to an example of the present disclosure.

Referring to FIG. 9, with respect to application maintenance metrics data, under the application maintenance tab, all of the project related metrics such as incident management, problem management, work request management, and application management may be updated and saved. For example, at 900, application maintenance metrics data may be updated as required (other options for selection may include incident management, problem management, work request management, application management). At 902, if a user chooses a manual mode of data entry in master set up (i.e., client not in AOAE), all data may be manually sourced. Otherwise, the user may have the option to auto-source from the AOAE or enter the data manually. At 904, a user may select the metric to be reported, the display name, lower control limit/upper control limit (LCL/UCL), and if the metric must be displayed in a client service reporting (CSR) report. Graphing and an option to display a metric commentary may also be selected. At 906, a user may add additional metrics, and select the "save" option to save the changes.

Figure 10:
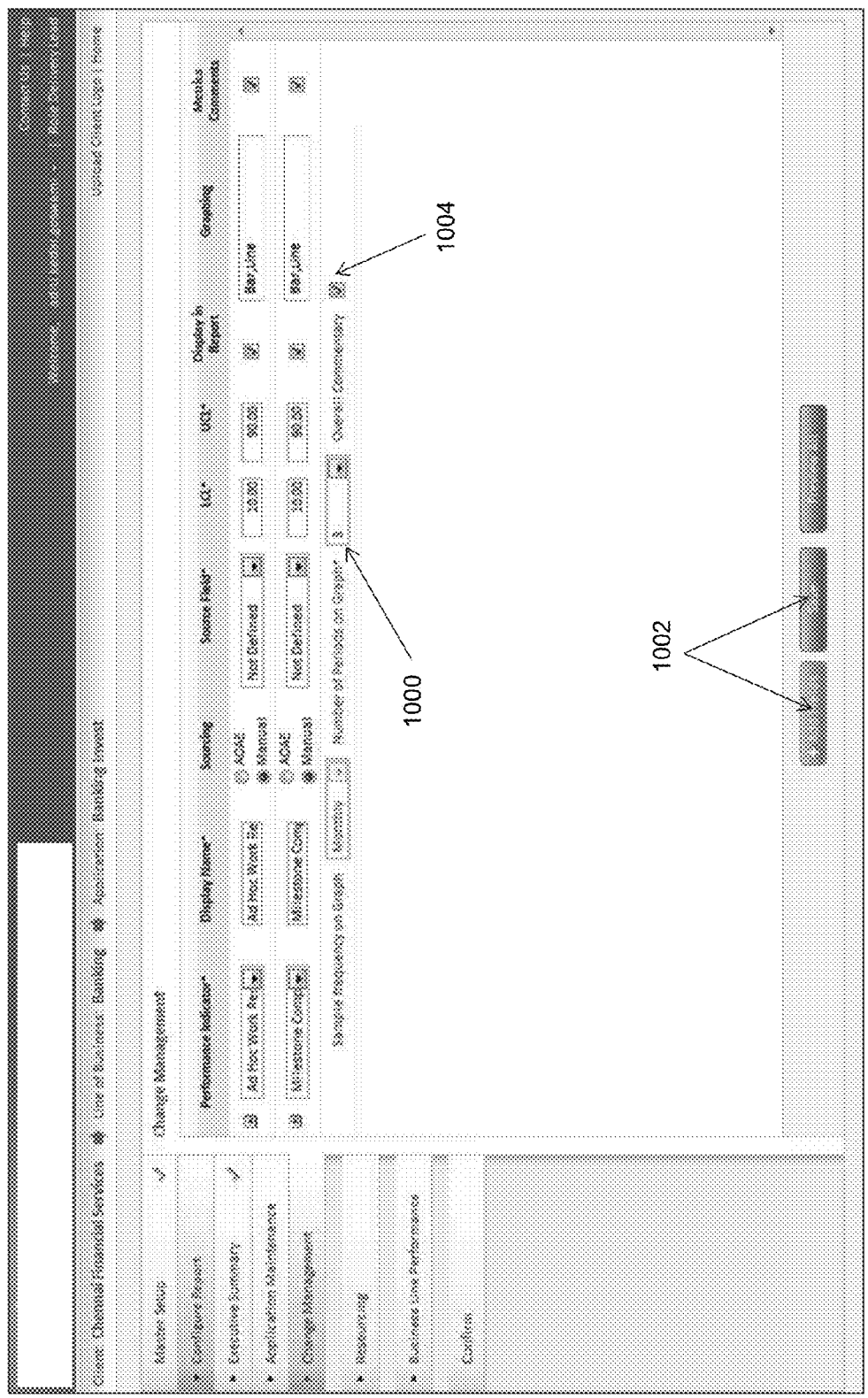
FIG. 10 illustrates a user-interface display for change management with respect to configuration for the client services reporting system of FIG. 1, according to an example of the present disclosure.

FIG. 10 illustrates a user-interface display for change management with respect to configuration for the system 100, according to an example of the present disclosure.

Referring to FIG. 10, with respect to change management, similar to application maintenance metrics data, lower control limit/upper control limit, graphing type, sourcing, source field, etc., may be updated and saved. For example, at 1000, for a graphical representation, a user may select a number of periods from the drop down menu. At 1002, a user may add additional metrics, and save the selections by using the "save" option. Once saved, change management may be displayed in a final report, for example, to a client. At 1004, in order to provide the overall commentary on the configurable section while preparing a report, a user may select an "overall commentary" option. With respect to determination of metrics, response SLA compliance may be determined, for example, as follows: CONVERT(DECIMAL(18,2),SUM(CASE WHEN [SLA Response]='MET' THEN 1 ELSE 0 END))*100/(CONVERT(DECIMAL(18, 2),SUM(CASE WHEN [SLA Response] IN ('MET', 'MISSED') THEN 1 ELSE 0 END))). With respect to determination of metrics, effort/ticket may be determined, for example, as follows: CONVERT(DECIMAL(18,2), SUM([Effort]))/(CONVERT(DECIMAL(18,2),60)*CONVERT(DECIMAL(18,2),COUNT(1))).

Figure 11:
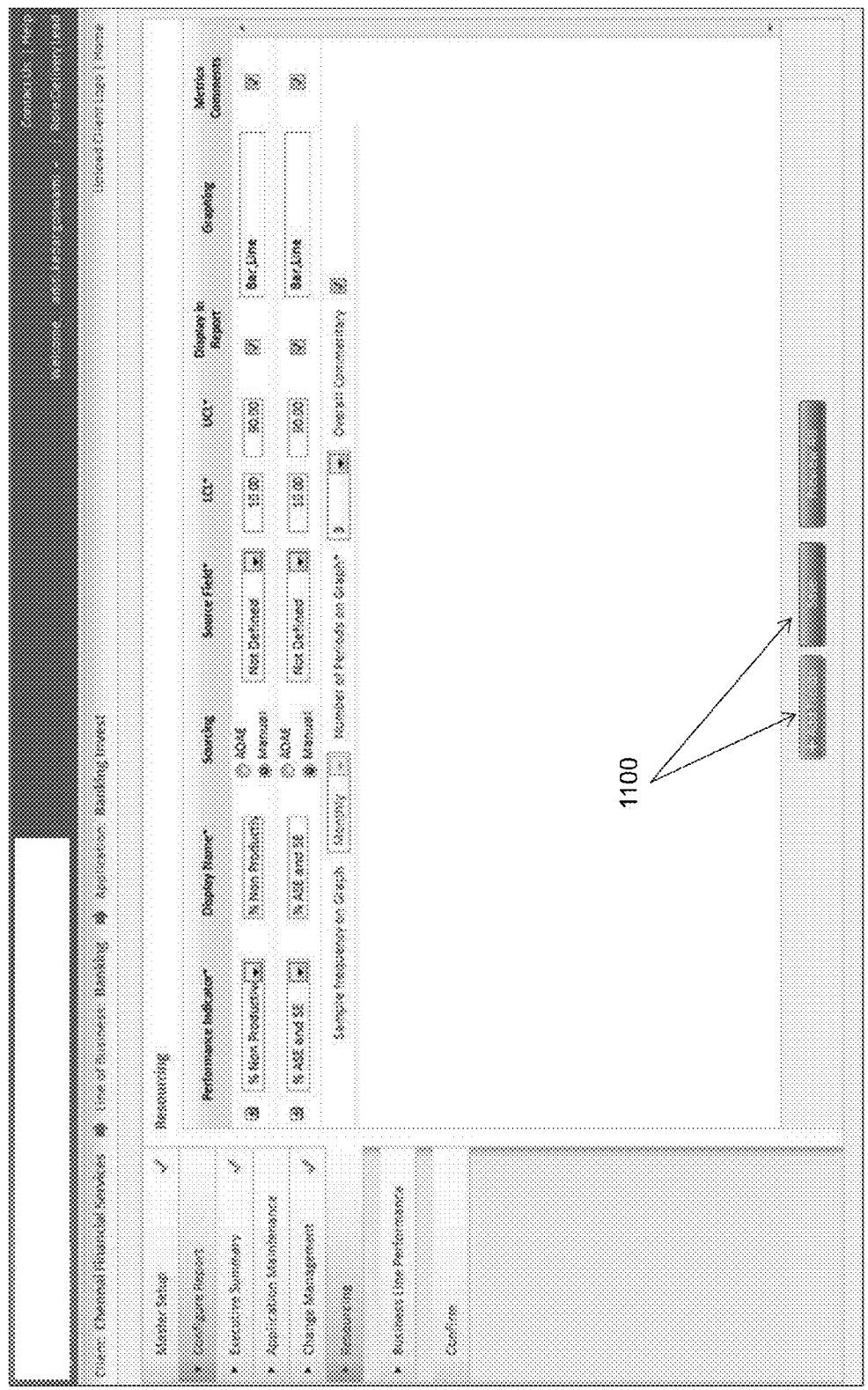
FIG. 11 illustrates a user-interface display for resourcing with respect to configuration for the client services reporting system of FIG. 1, according to an example of the present disclosure.

FIG. 11 illustrates a user-interface display for resourcing with respect to configuration for the system 100, according to an example of the present disclosure.

Referring to FIG. 11, with respect to resourcing, a user may select the metric to be reported, the display name, lower control limit/upper control limit, and if a metric is to be displayed in a CSR summary. Graphing and option to display a metric commentary may also be selected. At 1100, a user may add additional metrics, and select the "save" option, wherein once saved, resourcing will be displayed in final report, for example, to a client. As disclosed herein with respect to response SLA compliance and effort/ticket determination, metrics may be determined based on a combination of predefined fixed equations and input values, and/or using input data.

Figure 12:
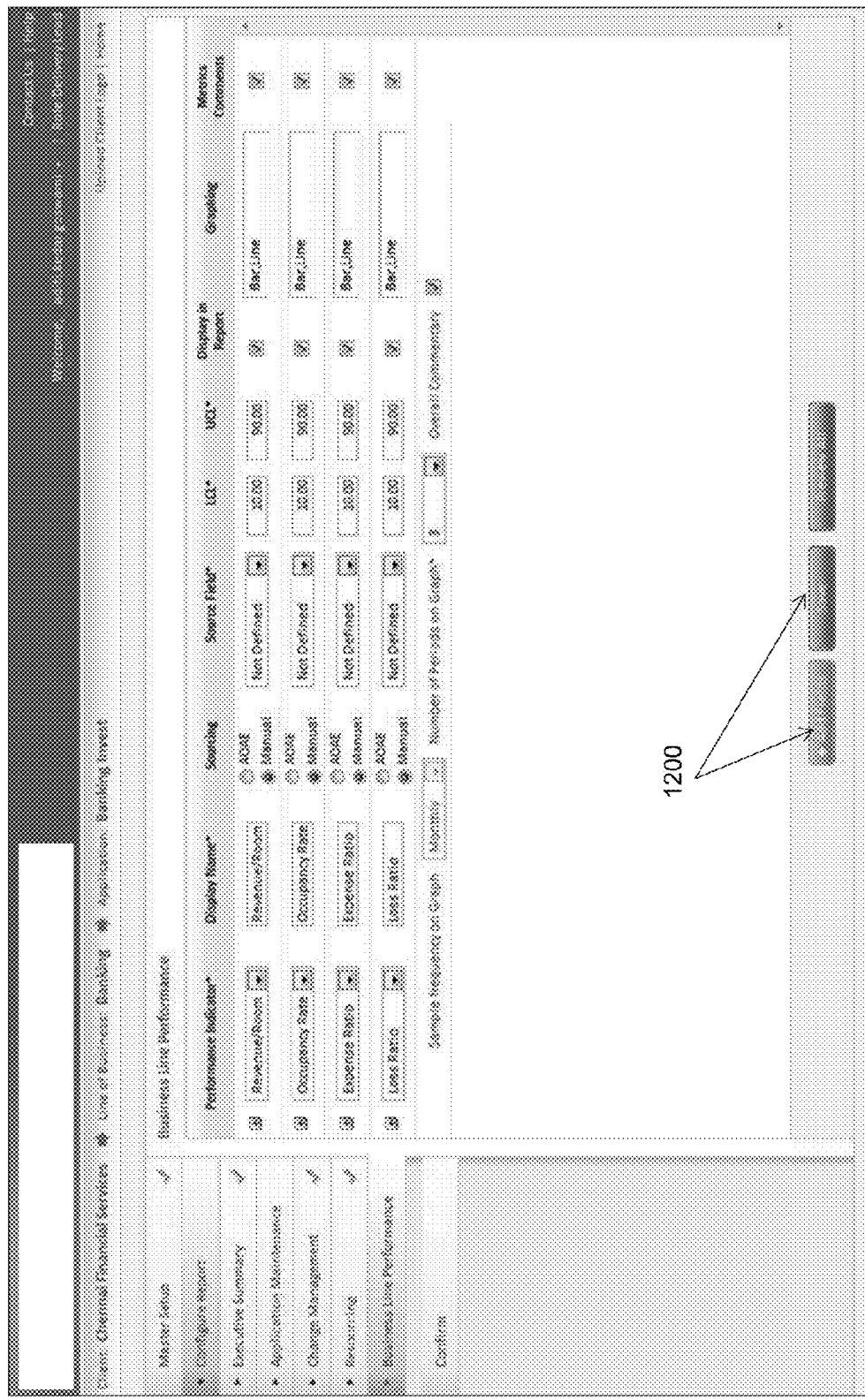
FIG. 12 illustrates a user-interface display for business line performance with respect to configuration for the client services reporting system of FIG. 1, according to an example of the present disclosure.

FIG. 12 illustrates a user-interface display for business line performance with respect to configuration for the system 100, according to an example of the present disclosure.

Referring to FIG. 12, with respect to business line performance, all the required data may be filled as shown in FIG. 12, and a user may select the "save" option to save changes. At 1200, a user may add additional metrics, and select the "save" option to save changes. Once saved, business line performance may be displayed in a final report, for example, for a client. As disclosed herein with respect to response SLA compliance and effort/ticket determination, metrics may be determined based on a combination of predefined fixed equations and input values, and/or using input data.

Figure 13:
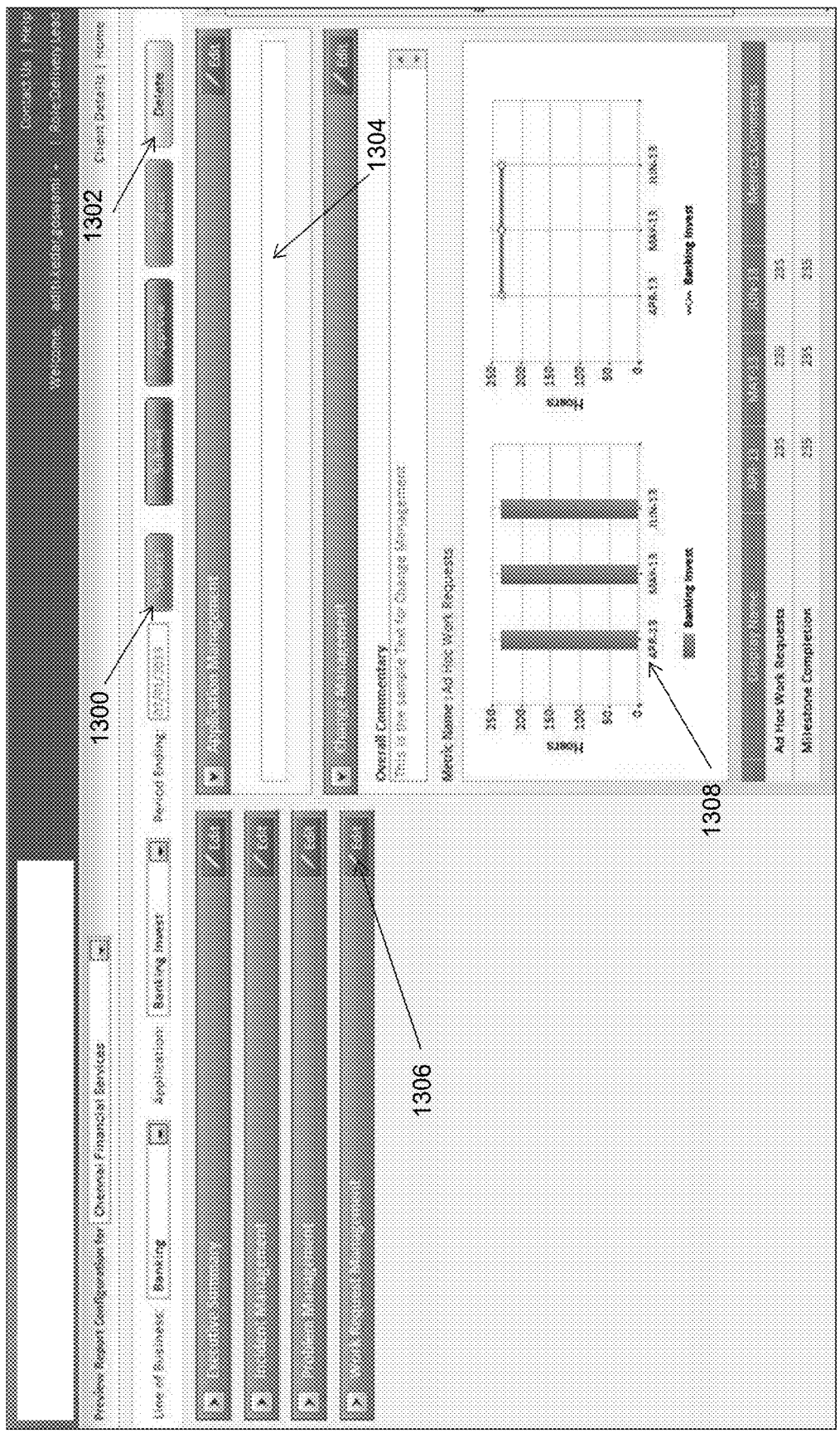
FIG. 13 illustrates a user-interface display for report confirmation with respect to configuration for the client services reporting system of FIG. 1, according to an example of the present disclosure.

FIG. 13 illustrates a user-interface display for report confirmation with respect to configuration for the system 100, according to an example of the present disclosure.

Referring to FIG. 13, with respect to report confirmation, after updating the required tabs, the configuration status of the report may be specified as "in draft". A delivery lead and/or a project manager may confirm the report on the configuration page, and preview the report before submitting the report for approval. For example, at 1300, a user may select the "select" option to review the data in every parameter. At 1302, a user may select the "delete" option to delete the complete configuration, and the status on home page may be changed to "not started". At 1304, the sections which were not saved during configuration may be shown as blank on the preview configuration page. At 1306, a user may select the "edit" option for every parameter to access the respective configuration page to apply any changes. At 1308, a graphical representation may be selected during the configuration of the report. The "delete" operation may delete configuration data from the database and prompt a user to re-configure data again.

Figure 14:
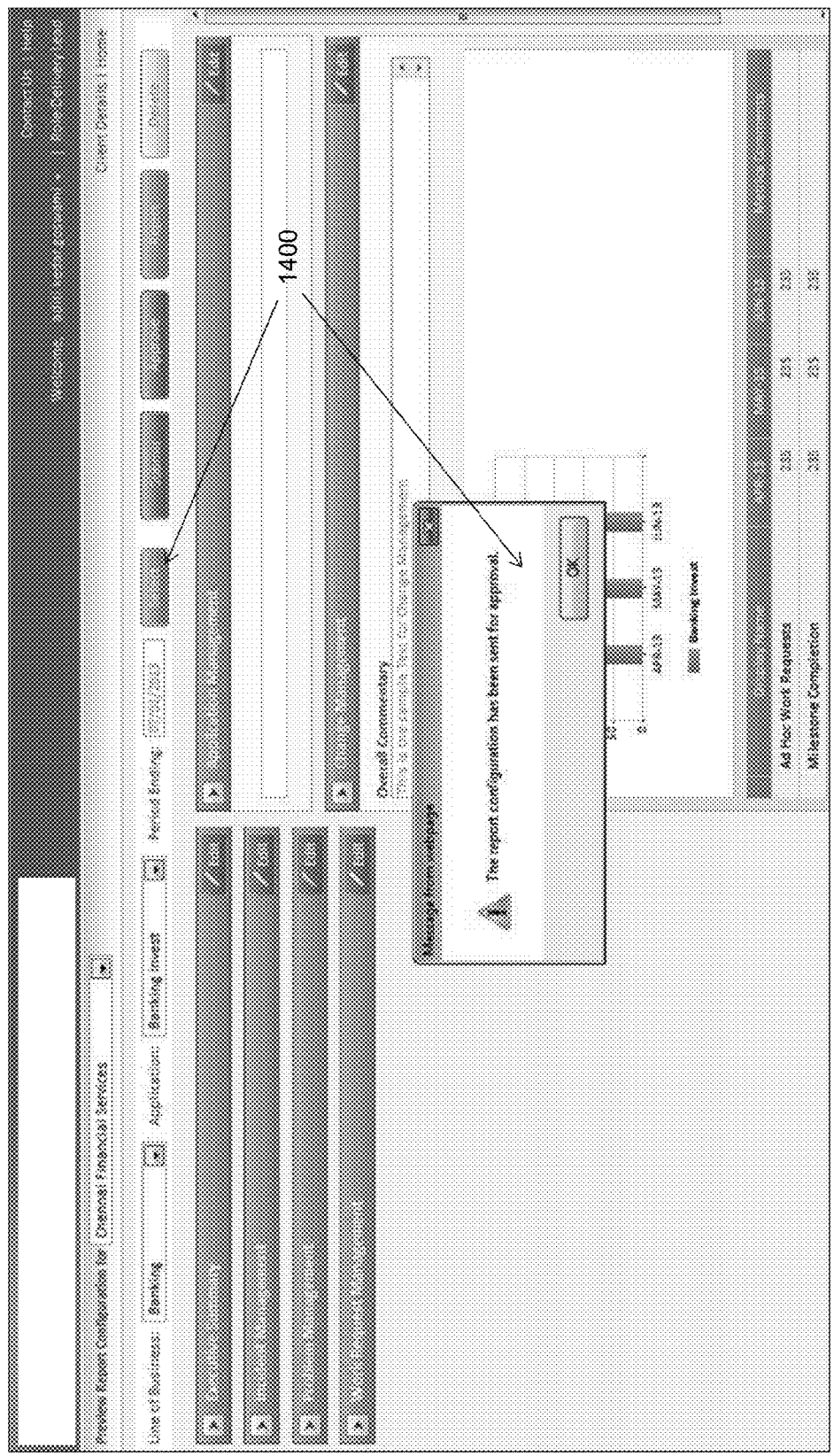
FIG. 14 illustrates a user-interface display for submittal for approval with respect to configuration for the client services reporting system of FIG. 1, according to an example of the present disclosure.

FIG. 14 illustrates a user-interface display for submittal for approval with respect to configuration for the system 100, according to an example of the present disclosure.

Referring to FIG. 14, with respect to submittal for approval, after updating required tabs, a delivery lead and/or a project manager may confirm the report on a configuration page, and preview the report before submitting the report for approval. At 1400, a user may select the "submit" option, and a pop-up window with a confirmation may be displayed to change the status of the submission for approval.

Figure 15:
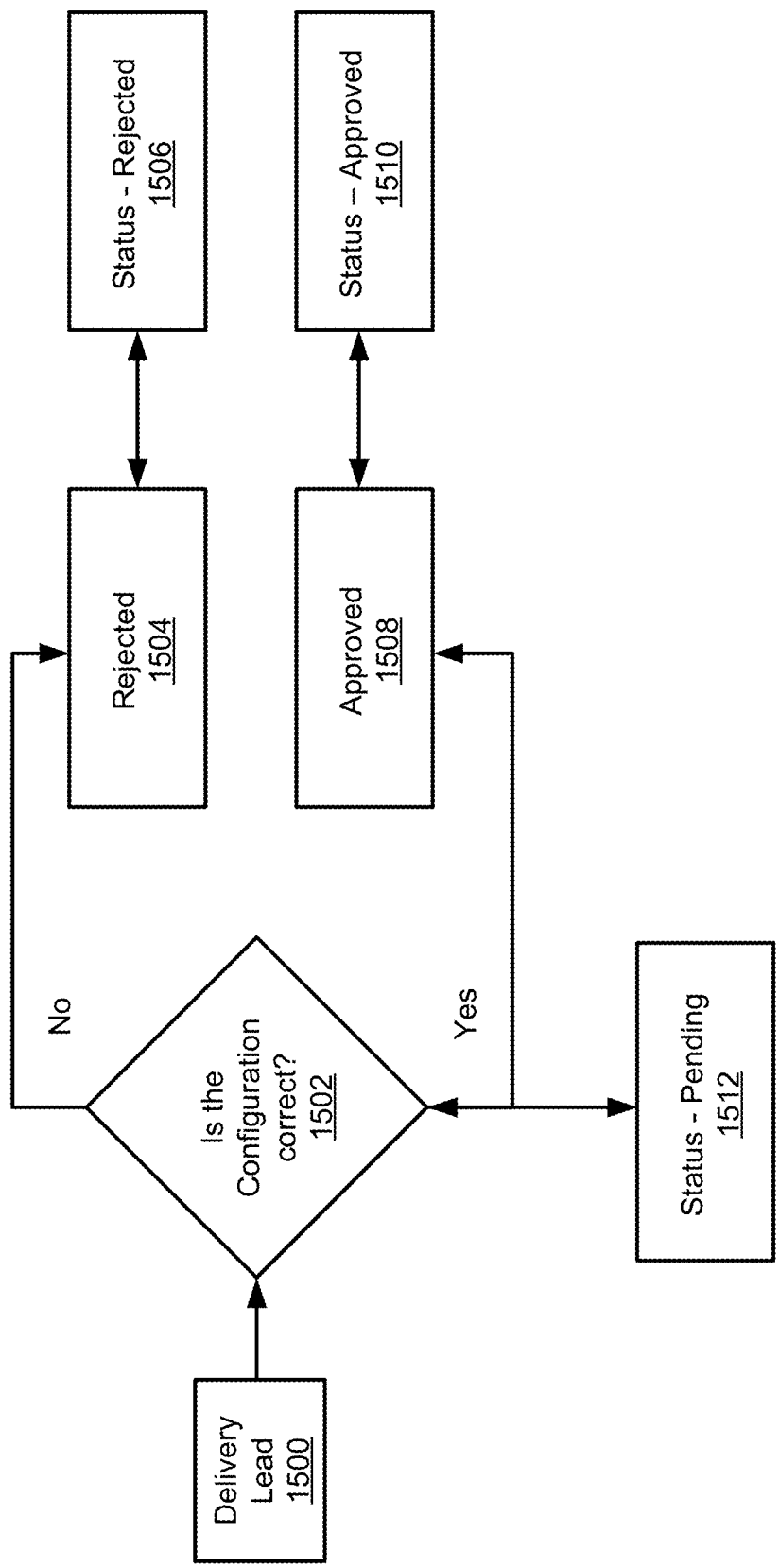
FIG. 15 illustrates an approval flow for the client services reporting system of FIG. 1, according to an example of the present disclosure.

FIG. 15 illustrates an approval flow for the system 100, according to an example of the present disclosure.

Referring to FIG. 15, with respect to the approval flow for the system 100, at 1500, a delivery lead input may determine, at 1502, whether the configuration is correct. At 1504, in response to a determination at 1502 that the configuration is not correct, the configuration may be rejected, and at 1506, the status may be specified as rejected. At 1508, in response to a determination at 1502 that the configuration is correct, the configuration may be approved, and at 1510, the status may be specified as approved. At 1512, the status of the configuration determination may be specified as pending. After approval, the status configuration may be considered as final, and based on this configuration, reports may be generated.

Figure 16:
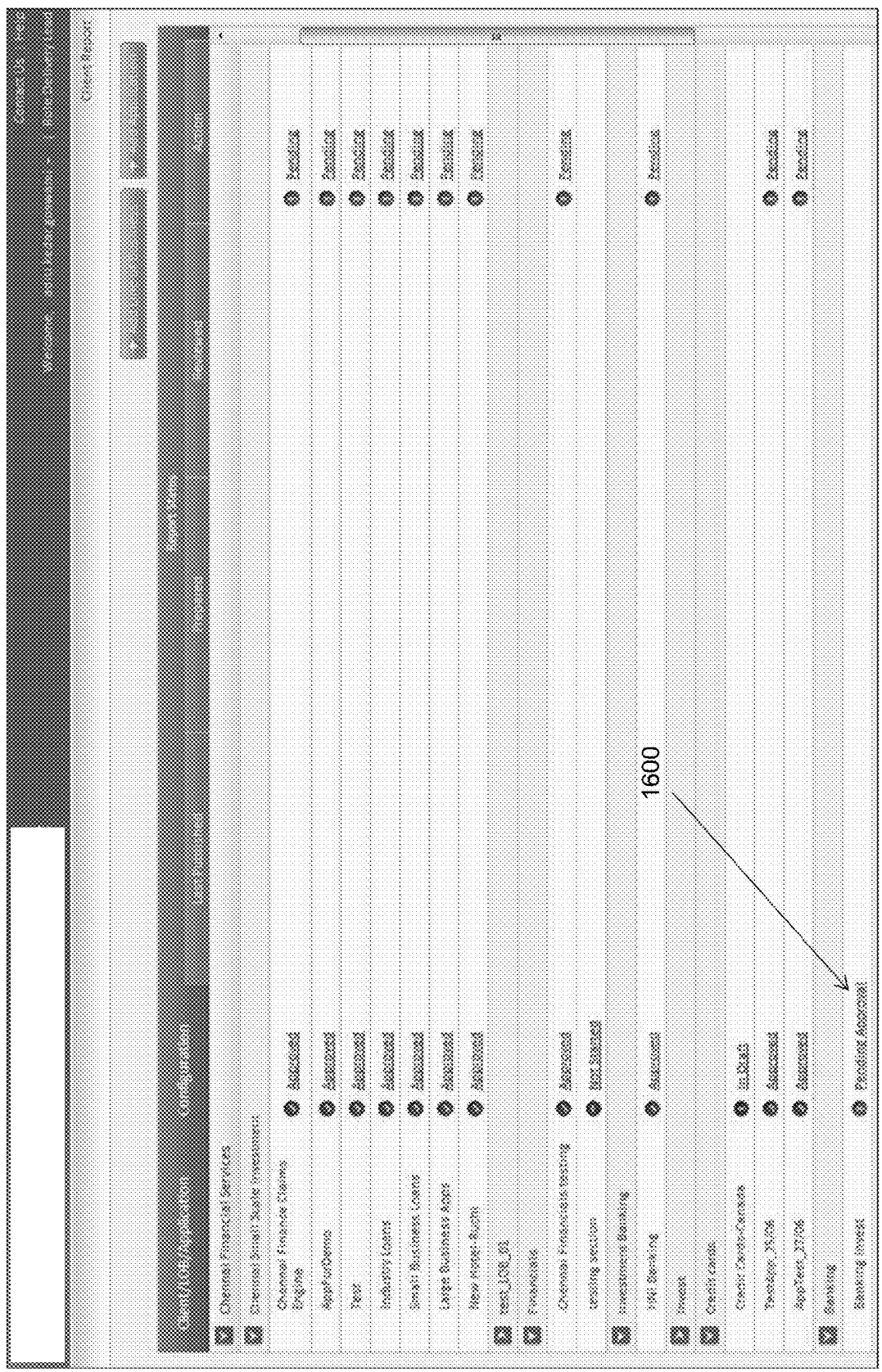
FIG. 16 illustrates a user-interface display for status with respect to approval for the client services reporting system of FIG. 1, according to an example of the present disclosure.

FIG. 16 illustrates a user-interface display for status with respect to approval for the system 100, according to an example of the present disclosure.

Referring to FIG. 16, with respect to status, on the landing page, the configuration status may be specified as "pending approval". In this regard, only certain users may approve or reject a report. For example, approval or rejection authorization may be limited to a delivery lead. Selection of a hyperlink may provide for navigation to a preview page. At 1600, a configuration status on the home page may be displayed as "pending approval".

Figure 17:
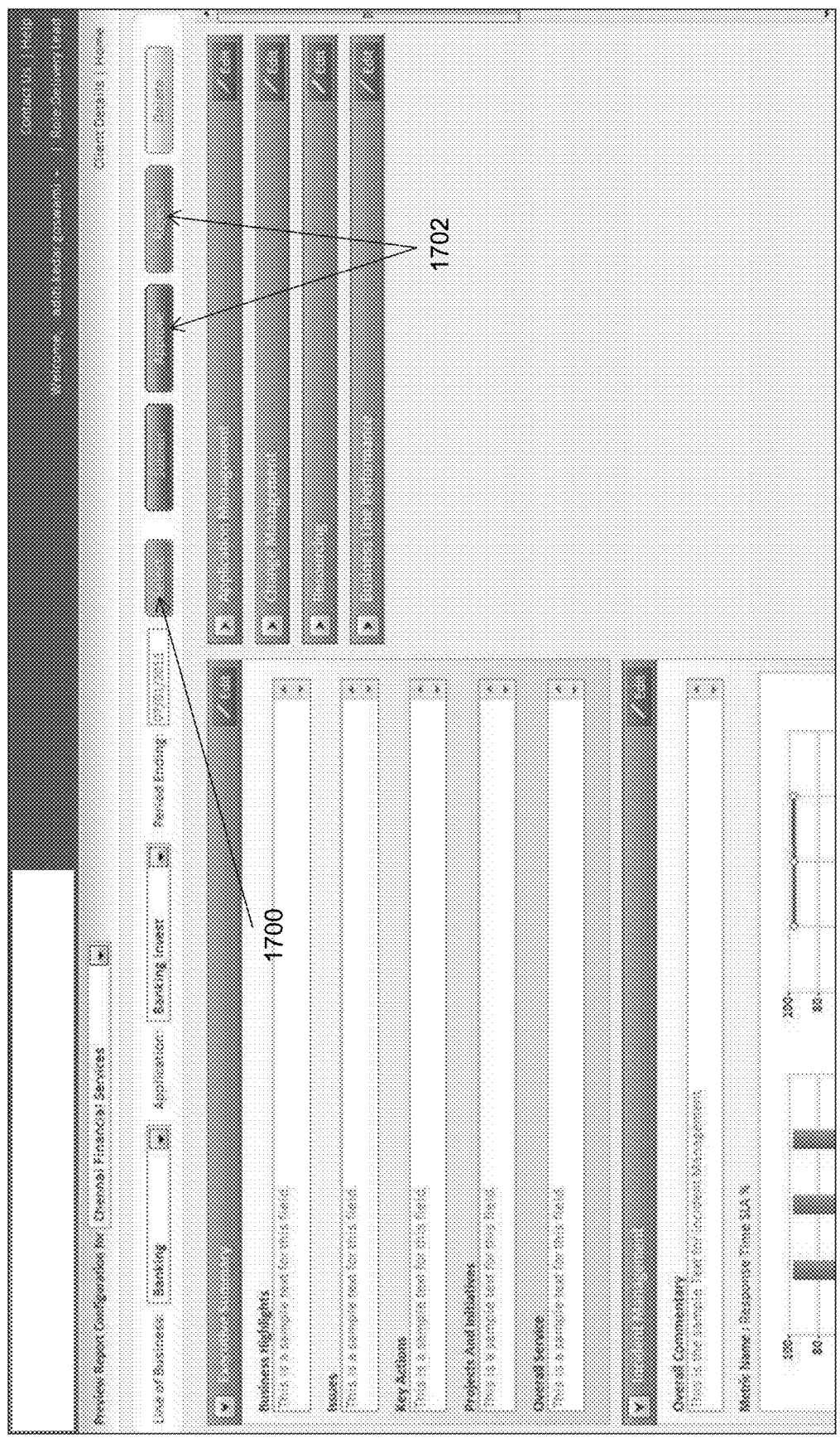
FIG. 17 illustrates a user-interface display for approval for the client services reporting system of FIG. 1, according to an example of the present disclosure.

FIG. 17 illustrates a user-interface display for approval for the system 100, according to an example of the present disclosure.

Referring to FIG. 17, with respect to approval, the preview page may display all of the report parameters. If the configurations are as expected, the delivery lead may approve the report (or otherwise reject the report). Once approved, the report may be forwarded for a next set of actions, i.e., confirm to publish, and publishing report. If rejected, the report may need to be started from the beginning, i.e., master setup and configuration. At 1700, a user may initiate the "select" option to view the report. At 1702, a delivery lead may select any one of the options to approve or reject. If approved, the next set of action may include preparing the report and publishing. If rejected, the configuration may need to be performed from the beginning.

Figure 18:
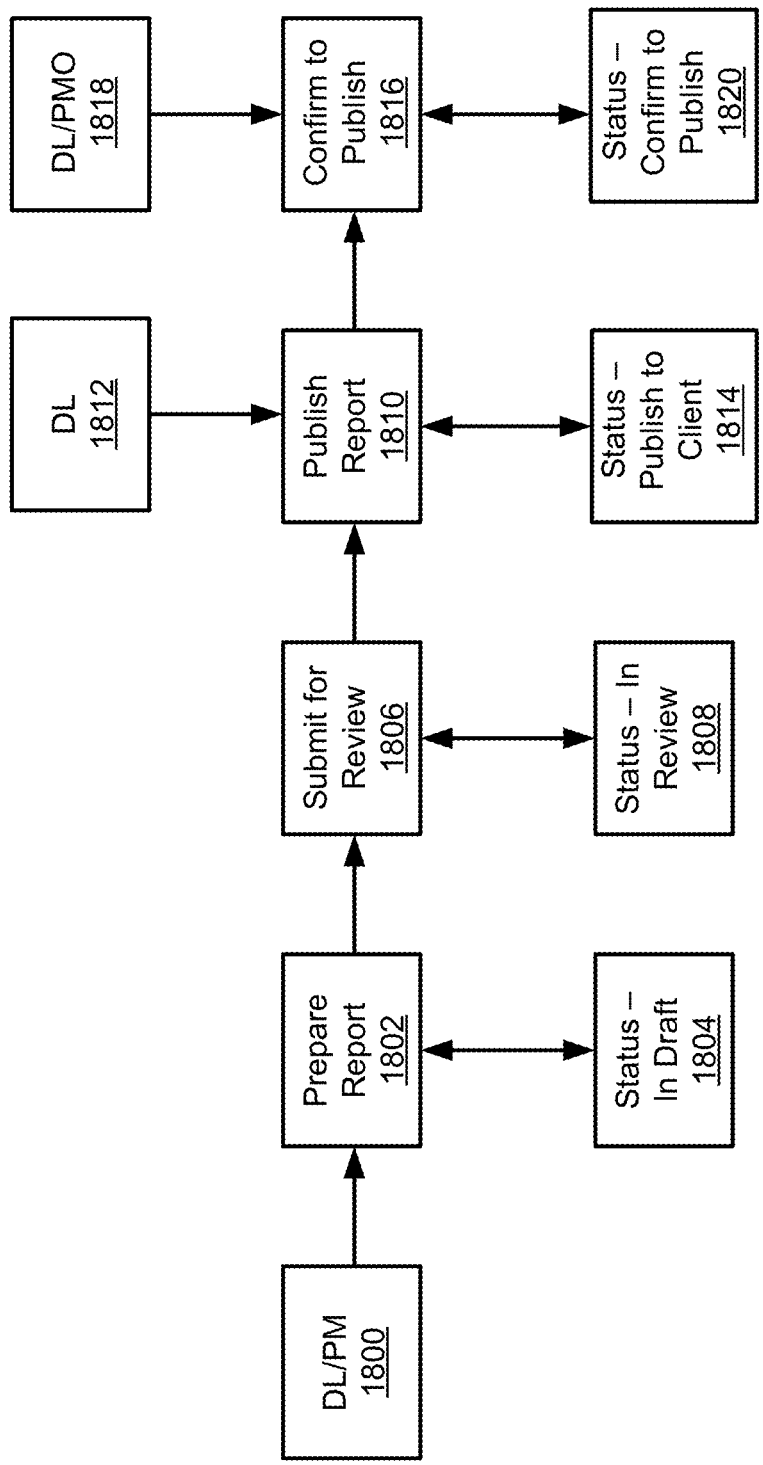
FIG. 18 illustrates a publish report flow for the client services reporting system of FIG. 1, according to an example of the present disclosure.

FIG. 18 illustrates a publish report flow for the system 100, according to an example of the present disclosure.

Referring to FIG. 18, at 1800, a delivery lead and/or a project manager may prepare a report at 1802 (with the status of the report being specified as "in draft" at 1804). The report may be submitted for review at 1806 (with the status of the report being specified as "in review" at 1808). The report may be published at 1810 (with input from the delivery lead at 1812, and with the status of the report being specified as "publish to client" at 1814). The report may be confirmed for publication at 1816 (with input from the delivery lead and/or project management office at 1818, and with the status of the report being specified as "confirm to publish" at 1820). After report publication, the associated data may be locked for that period, and user may be provided an option to view the report.

Figure 19:
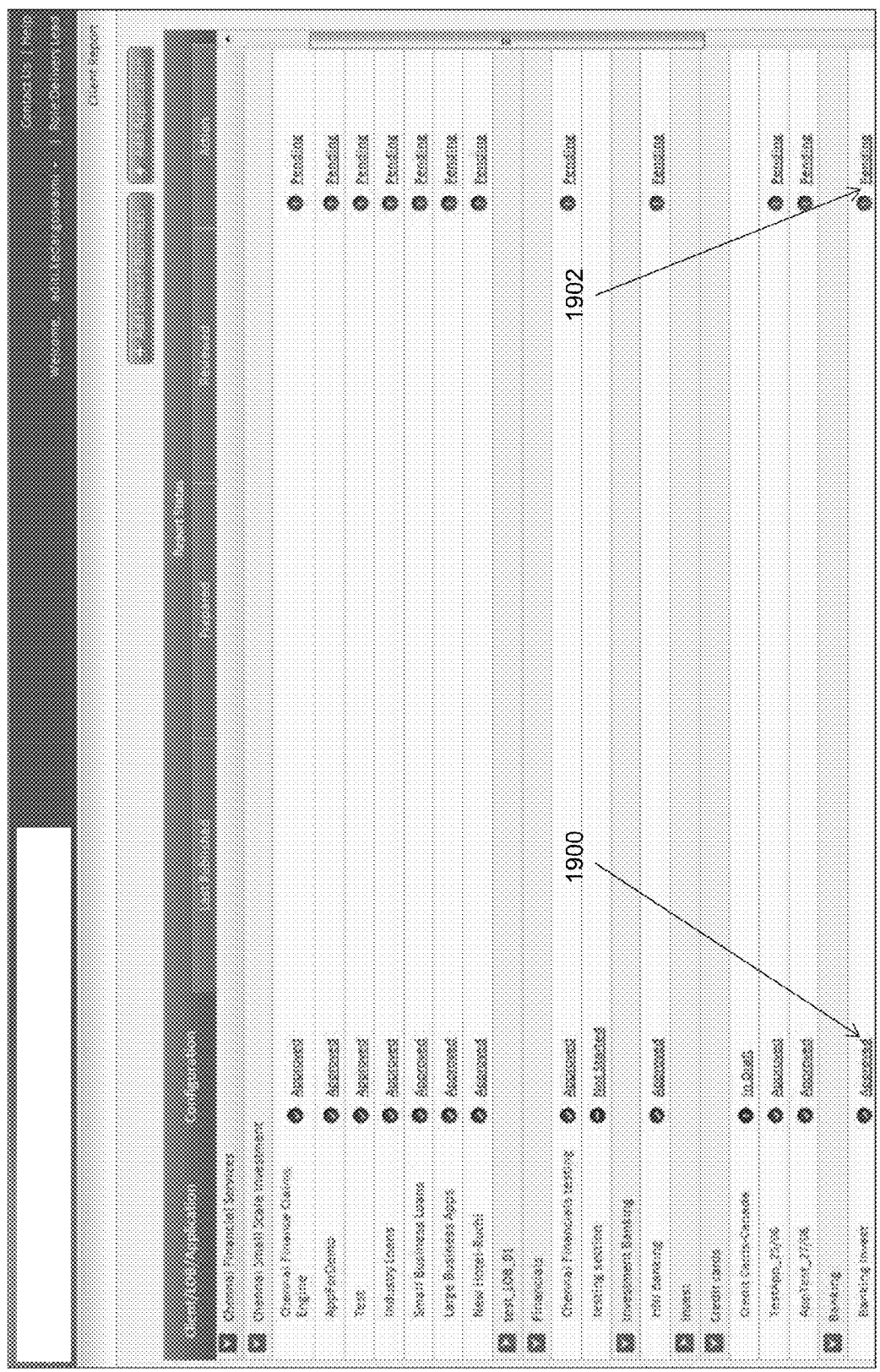
FIG. 19 illustrates a user-interface display for status on home page with respect to publish report for the client services reporting system of FIG. 1, according to an example of the present disclosure.

FIG. 19 illustrates a user-interface display for status on home page with respect to publish report for the system 100, according to an example of the present disclosure.

Referring to FIG. 19, with respect to status on home page, after the report is approved, the configuration status may be updated as "approved", and the action column under report status on home page may be updated as "pending". By selection of the associated links, a delivery lead and/or project manager may navigate to the "prepare" report page. At 1900, the configuration status may be updated as "approved" after the delivery lead approves the configuration. In case the configuration is rejected, the status may be specified as "not started". At 1902, an action under report status will be "pending" when the report is yet to be prepared by the delivery lead and/or project manager.

Figure 20:
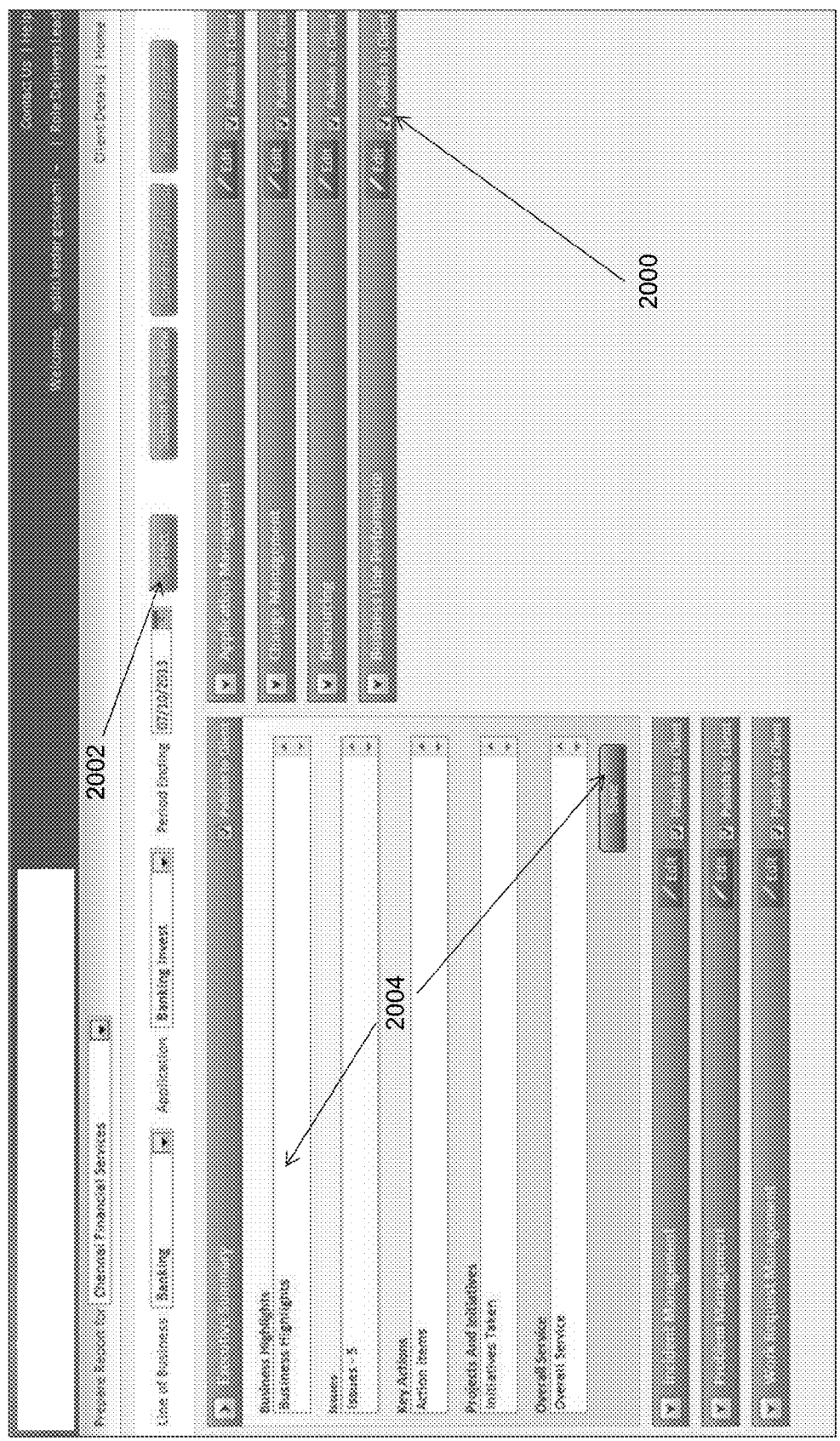
FIG. 20 illustrates a user-interface display for report preparation with respect to publish report for the client services reporting system of FIG. 1, according to an example of the present disclosure.

FIG. 20 illustrates a user-interface display for report preparation with respect to publish report for the system 100, according to an example of the present disclosure.

Referring to FIG. 20, with respect to report preparation, the delivery lead and/or project manager may prepare the report, for example, by updating the overall commentary and executive summary on the prepare report page, and save the changes. Metrics data and comments may be editable, and also updated as needed. At 2000, the publish to client option may be available only in reviewer screens. If the publish to client option is unchecked, the configurable section will not be displayed in the final report. At 2002, a user may select the "select" option to view all of the configuration parameters. At 2004, the summary text boxes are editable, and may be updated and saved.

Figure 21:
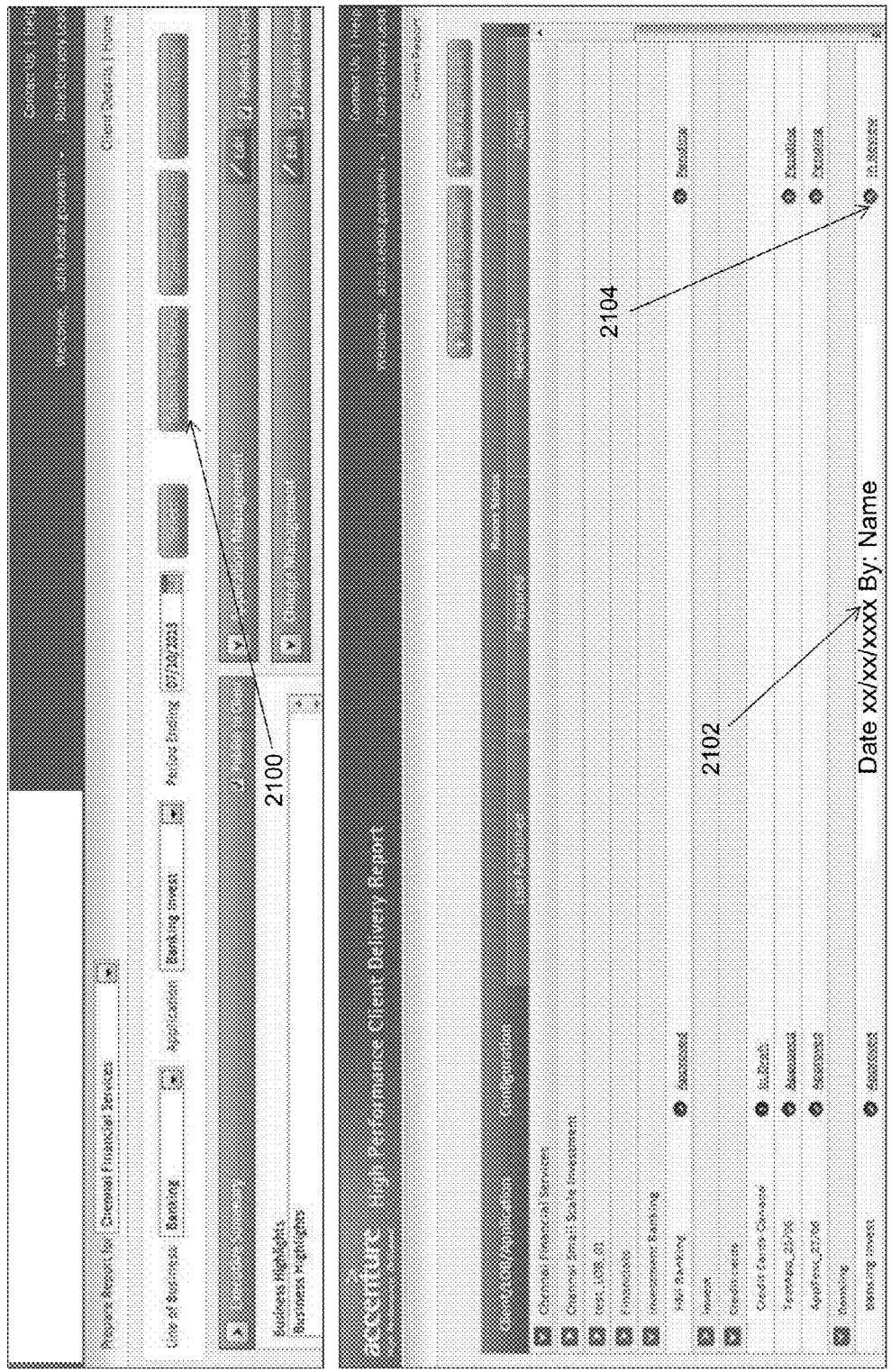
FIG. 21 illustrates a user-interface display for submittal for review with respect to publish report for the client services reporting system of FIG. 1, according to an example of the present disclosure.

FIG. 21 illustrates a user-interface display for submittal for review with respect to publish report for the system 100, according to an example of the present disclosure.

Referring to FIG. 21, with respect to submittal for review, once the report is prepared by the delivery lead and/or project manager, the report should be submitted for review. The report status on the home page may be specified as "in review". At 2100, once all of the fields are updated, a user may select the "submit for review" option. At 2102, the date and enterprise identification may be updated under the prepared column. At 2104, the report status after submittal for review may be specified as "in review".

Figure 22:
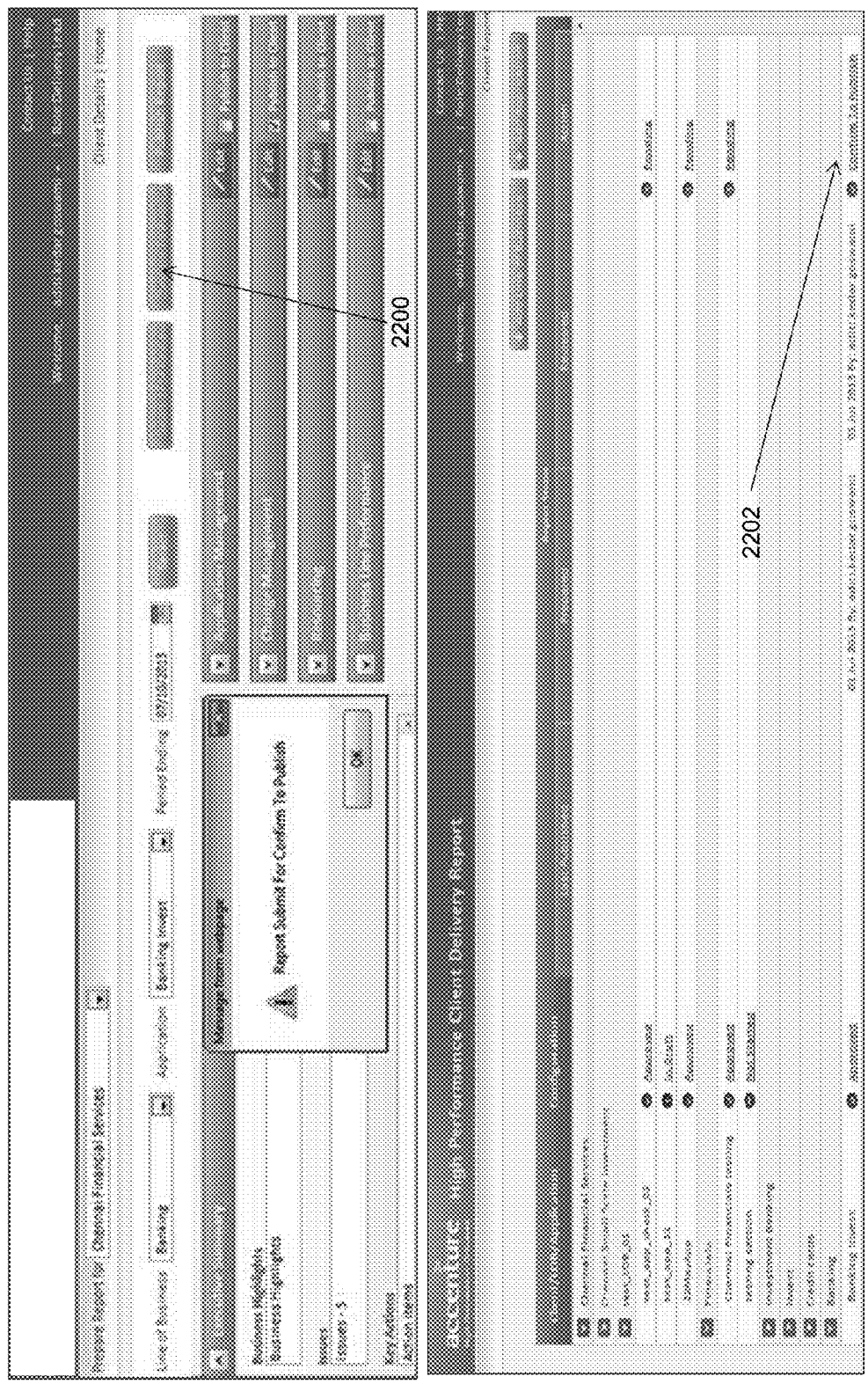
FIG. 22 illustrates a user-interface display for confirmation to publish with respect to publish report for the client services reporting system of FIG. 1, according to an example of the present disclosure.

FIG. 22 illustrates a user-interface display for confirmation to publish with respect to publish report for the system 100, according to an example of the present disclosure.

Referring to FIG. 22, with respect to confirmation to publish, once the delivery lead reviews the report, the delivery lead and/or the project management office may provide confirmation to publish the report to the client. The report status on the home page may be specified as "confirm to publish". At 2200, once all of the changes are saved, the delivery lead and/or the project management office (e.g., a project manager) may provide confirmation to publish the report by selecting the "confirm to publish" option. At 2202, the report status post submitted for review may be specified as "confirm to publish".

Figure 23:
FIG. 23 illustrates a user-interface display for report publishing with respect to publish report for the client services reporting system of FIG. 1, according to an example of the present disclosure.

FIG. 23 illustrates a user-interface display for report publishing with respect to publish report for the system 100, according to an example of the present disclosure.

Referring to FIG. 23, with respect to report publishing, once the delivery lead and/or the project management office confirms to publish the report to the client, the delivery lead having access to "publish report" may publish the report to the client. After publishing the report, the status of the report may be updated to "published to client". The delivery lead may also view the client home page and confirm if the report has been published. At 2300, the delivery lead may publish the report to the client by selecting the "publish report" option. At 2302, the report status after submittal for review will be "published to client".

Figure 24:
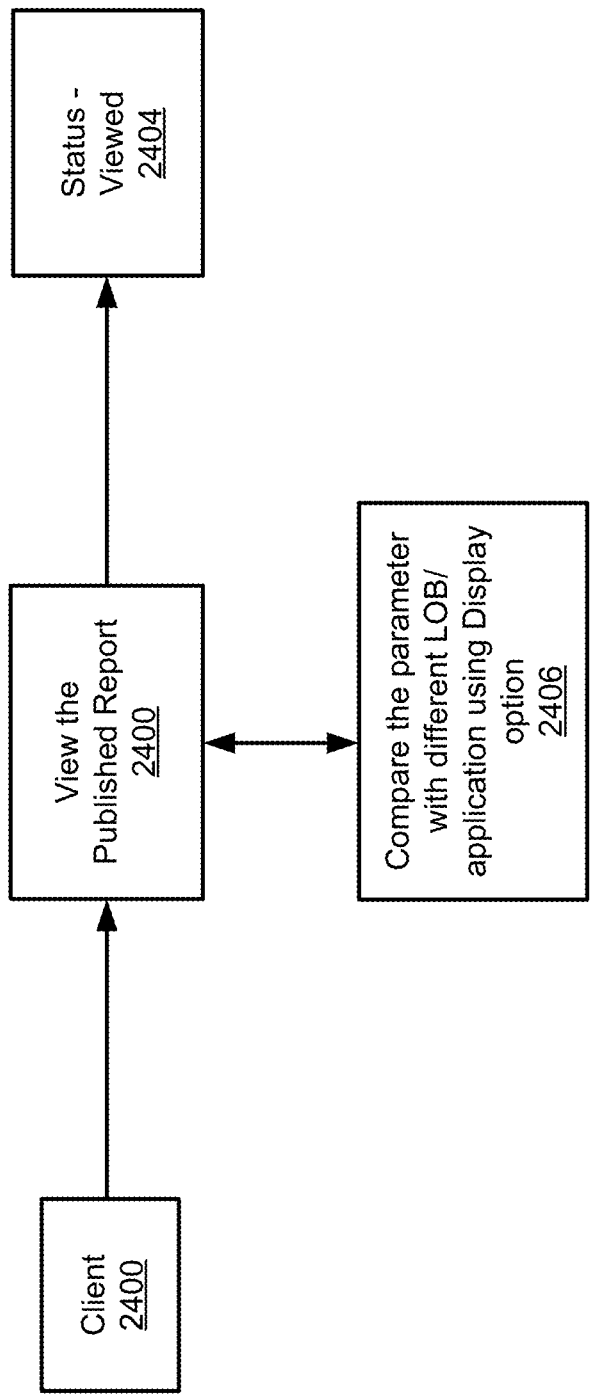
FIG. 24 illustrates a client flow for the client services reporting system of FIG. 1, according to an example of the present disclosure.

FIG. 24 illustrates a client flow for the system 100, according to an example of the present disclosure.

Referring to FIG. 24, at 2400, the client may view the published report at 2402. At 2404, the status of the report may be specified as viewed. At 2406, a parameter such as metrics may be compared with a different line of business and/or application using the display option (e.g., TBD may be compared with CSR team).

Figure 25:
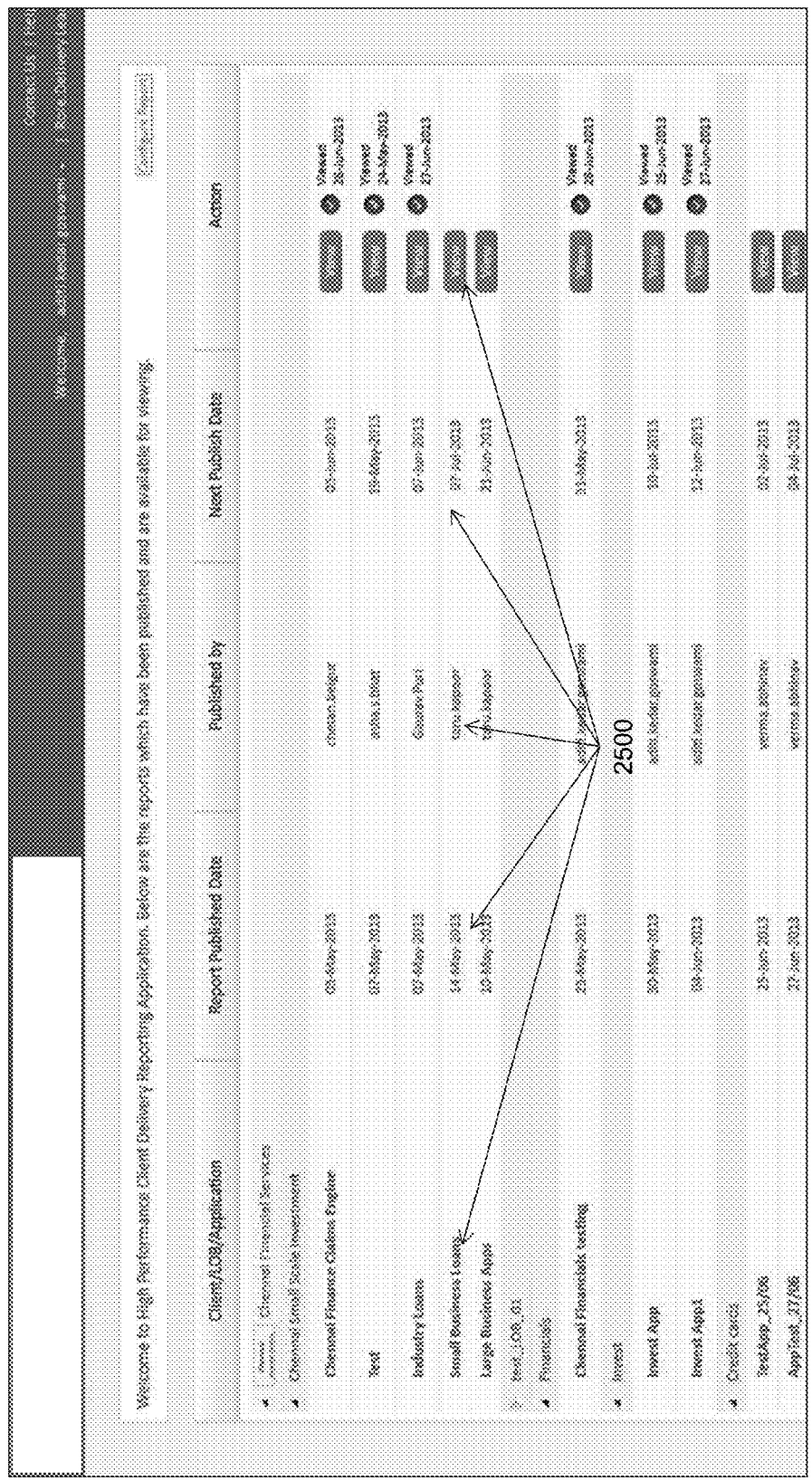
FIG. 25 illustrates a user-interface display for a client view for the client services reporting system of FIG. 1, according to an example of the present disclosure.

FIG. 25 illustrates a user-interface display for a client view for the system 100, according to an example of the present disclosure.

Referring to FIG. 25, with respect to the client view, a client may view the reports published by the delivery lead for a line of business and/or application with required details, such as, for example, published date, published by information, next publish date, and set of actions (e.g., viewing, date viewed, etc.). At 2500, on the client home page, a client may view all reports for the applications under a specific line of business along with the details of published date, published by date, next publish date, and the set of actions available for the client.

Figure 26:
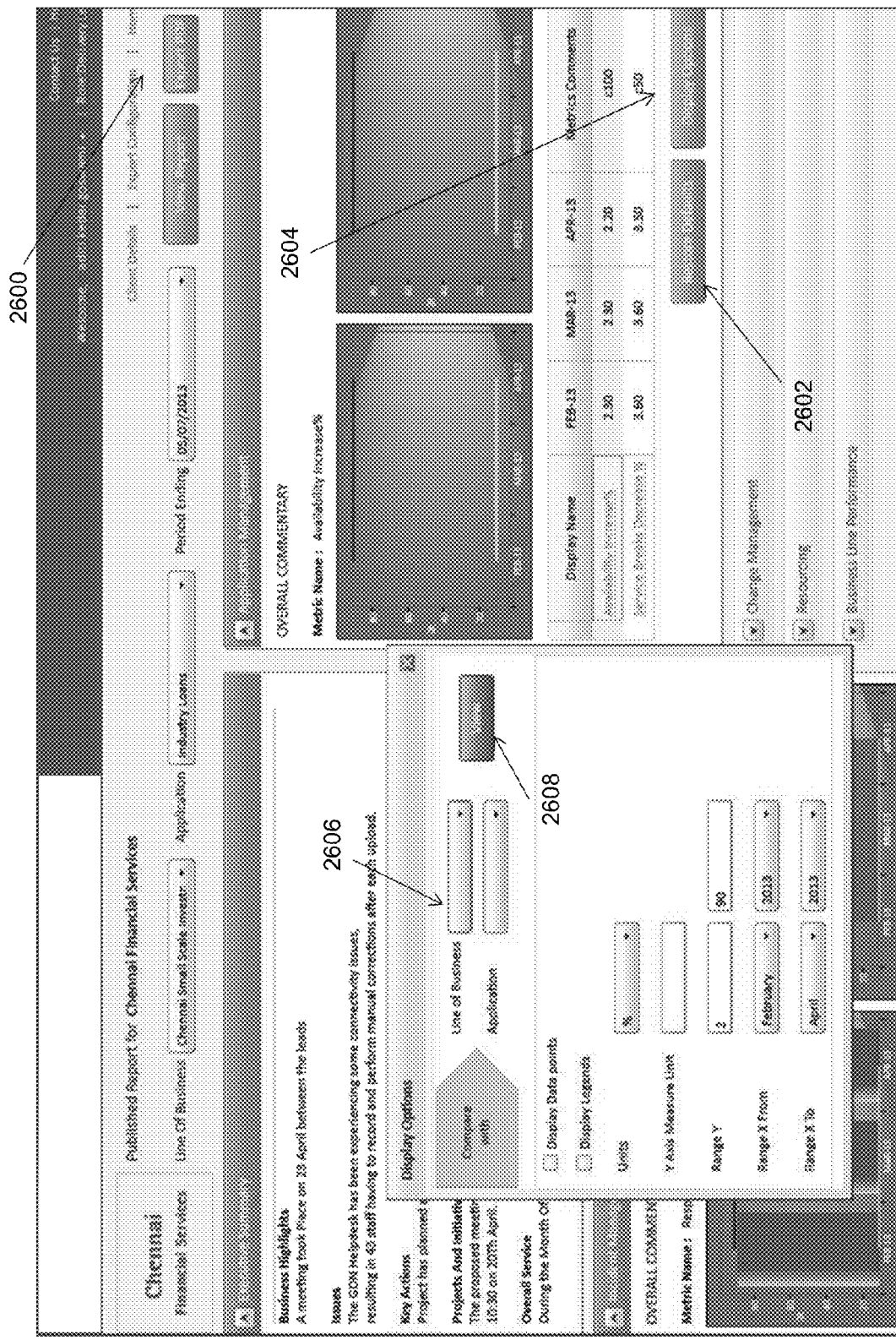
FIG. 26 illustrates a user-interface display for comparing line of businesses and applications for a client view for the client services reporting system of FIG. 1, according to an example of the present disclosure.

FIG. 26 illustrates a user-interface display for comparing line of businesses and applications for a client view for the system 100, according to an example of the present disclosure.

Referring to FIG. 26, with respect to comparing line of businesses and applications, a client may compare current application parameters with parameters with different line of business and/or application parameters, and may also restore the default values published in a current report. At 2600, the report may be exported in a specified format, for example, to PDF, by selecting the "export PDF" option. At 2602, a user may select the "restore defaults" option to restore the values of the current published report. At 2604, a user may select the "display options" option to display further options with respect to application management. At 2606, a user may select the line or business and/or application to be compared with. At 2608, a user may select the "view" option to view a report.

Figure 27:
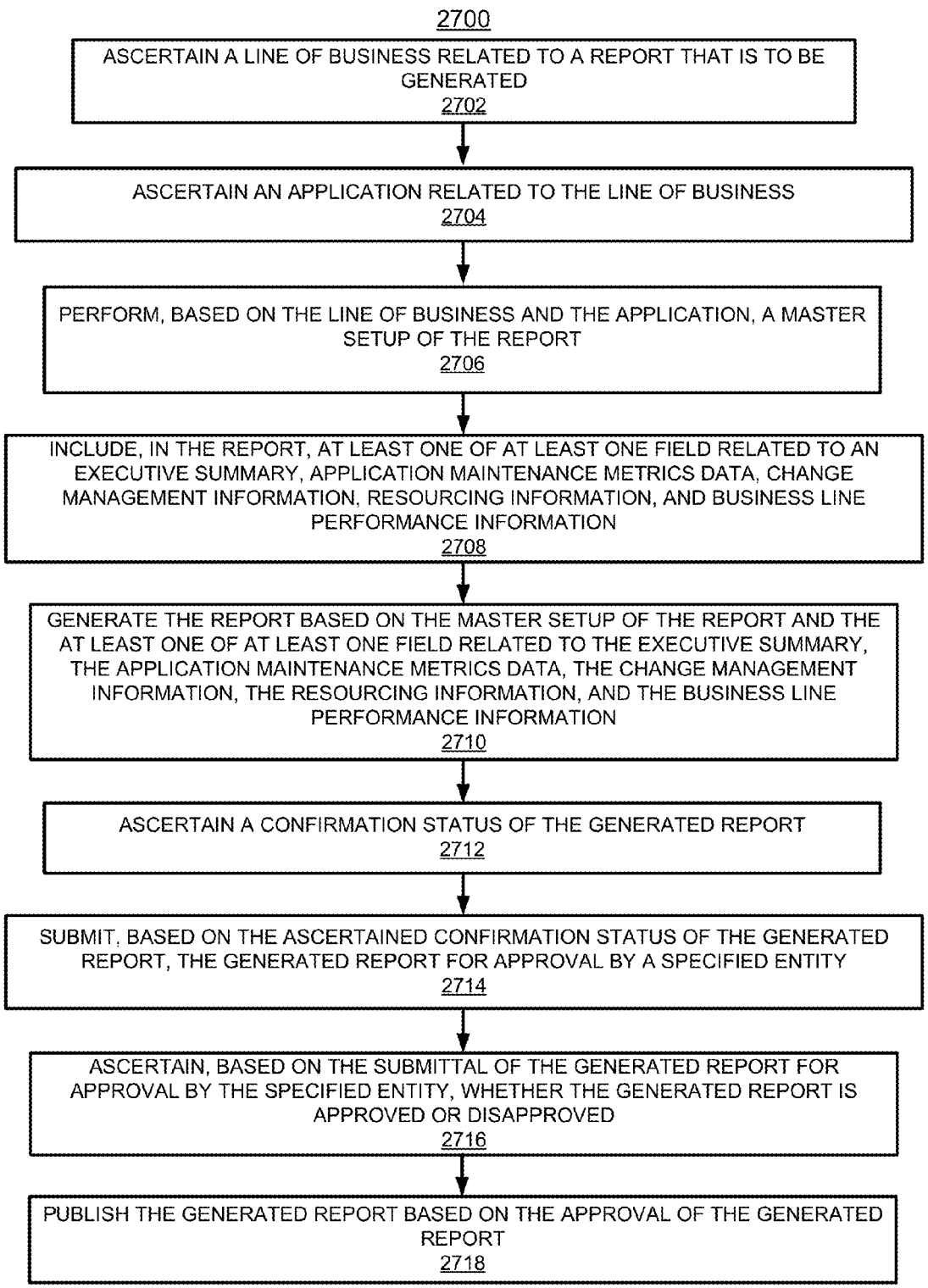
FIG. 27 illustrates a flowchart of a method for client services reporting, according to an example of the present disclosure.
Figure 28:
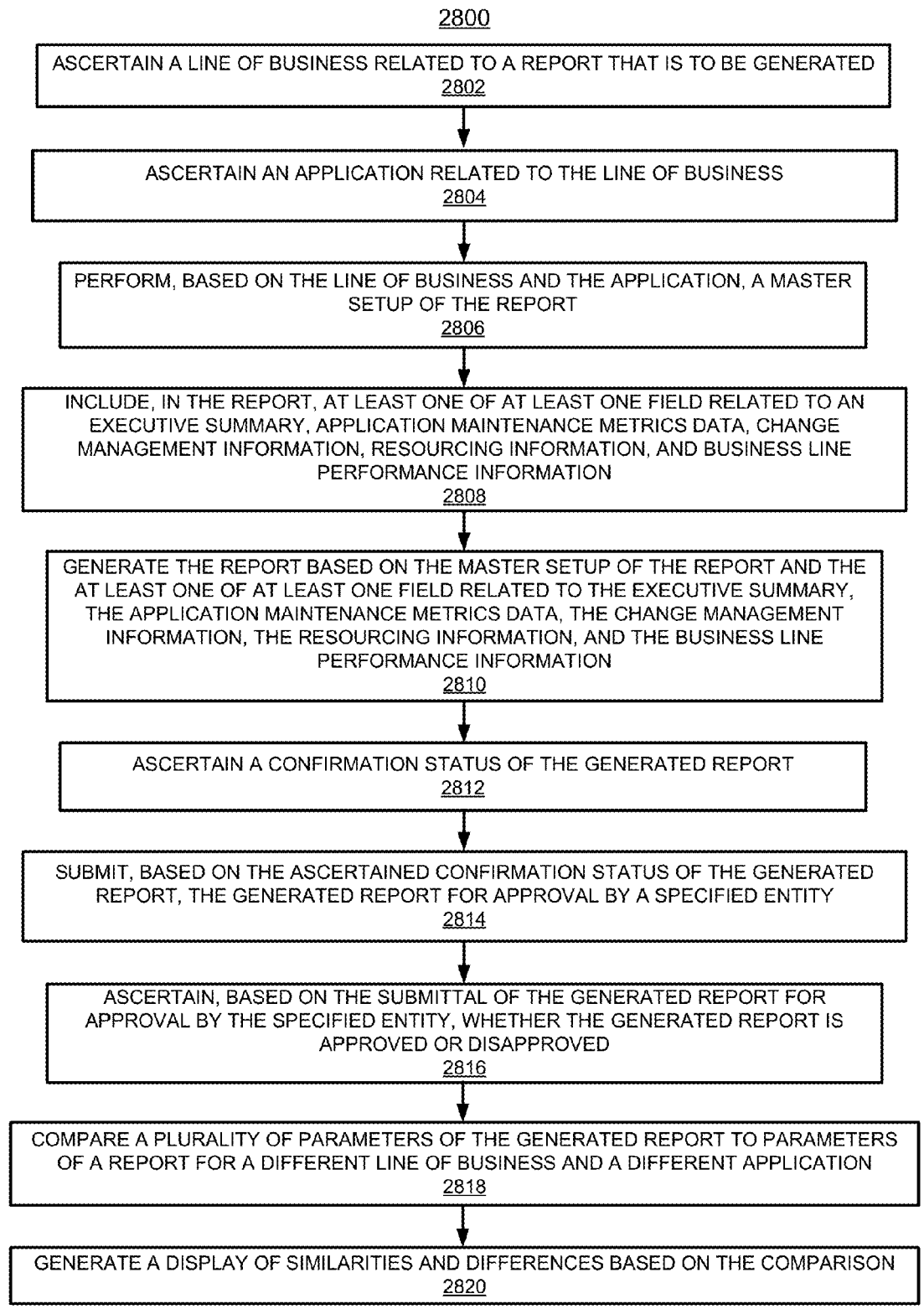
FIG. 28 illustrates another flowchart of a method for client services reporting, according to an example of the present disclosure.

FIGS. 27 and 28 respectively illustrate flowcharts of methods 2700 and 2800 for client services reporting, according to examples. The methods 2700 and 2800 may be implemented on the system 100 described above with reference to FIGS. 1-26 by way of example and not limitation. The methods 2700 and 2800 may be practiced in other systems.

Referring to FIGS. 1-27, and particularly FIG. 27, at block 2702, the method 2700 may include ascertaining a line of business 106 related to a report 104 that is to be generated.

At block 2704, the method 2700 may include ascertaining an application 108 related to the line of business 106.

At block 2706, the method 2700 may include performing, based on the line of business 106 and the application 108, a master setup 110 of the report 104. The master setup 110 may include information related to a scope of services, a service model, a service level agreement description, a contract overview, and service management.

At block 2708, the method 2700 may include including, in the report 104, a field related to an executive summary, application maintenance metrics data, change management information, resourcing information, and/or business line performance information.

At block 2710, the method 2700 may include generating the report 104 based on the master setup 110 of the report 104 and the field related to the executive summary, the application maintenance metrics data, the change management information, the resourcing information, and/or the business line performance information.

At block 2712, the method 2700 may include ascertaining a confirmation status of the generated report 104.

At block 2714, the method 2700 may include submitting, based on the ascertained confirmation status of the generated report 104, the generated report 104 for approval by a specified entity.

At block 2716, the method 2700 may include ascertaining, based on the submittal of the generated report 104 for approval by the specified entity, whether the generated report 104 is approved or disapproved.

At block 2718, the method 2700 may include publishing the generated report 104 based on the approval of the generated report 104.

According to examples, for the method 2700, performing, based on the line of business 106 and the application 108, the master setup 110 of the report 104 may further include performing, based on the line of business 106 and the application 108, the master setup 110 of the report 104 to include a publishing interval of the report 104.

According to examples, for the method 2700, the master setup 110 may include information related to the scope of services, the service model, the service level agreement description, the contract overview, and service management as mandatory fields of the report 104 that are unchangeable after completion of the configuration of the report 104.

According to examples, for the method 2700, the application maintenance metrics data may include metrics derived from incident management, problem management, work request management, and/or application management.

According to examples, for the method 2700, the change management information may include lower and upper control limits related to a graph included in the report 104.

Referring to FIGS. 1-26 and 28, and particularly FIG. 28, at block 2802, the method 2800 may include ascertaining a line of business 106 related to a report 104 that is to be generated.

At block 2804, the method 2800 may include ascertaining an application 108 related to the line of business 106.

At block 2806, the method 2800 may include performing, based on the line of business 106 and the application 108, a master setup 110 of the report 104. The master setup 110 may include information related to a scope of services, a service model, a service level agreement description, a contract overview, and/or service management.

At block 2808, the method 2800 may include including, in the report 104, a field related to an executive summary, application maintenance metrics data, change management information, resourcing information, and/or business line performance information.

At block 2810, the method 2800 may include generating the report 104 based on the master setup of the report 104 and the field related to the executive summary, the application maintenance metrics data, the change management information, the resourcing information, and/or the business line performance information.

At block 2812, the method 2800 may include ascertaining a confirmation status of the generated report 104.

At block 2814, the method 2800 may include submitting, based on the ascertained confirmation status of the generated report 104, the generated report 104 for approval by a specified entity.

At block 2816, the method 2800 may include ascertaining, based on the submittal of the generated report 104 for approval by the specified entity, whether the generated report 104 is approved or disapproved.

At block 2818, the method 2800 may include comparing a plurality of parameters of the generated report 104 to parameters of a report for a different line of business 106 and a different application.

At block 2820, the method 2800 may include generating a display of similarities and differences based on the comparison.

According to examples, the method 2800 may further include ascertaining whether the generated report 104 is approved or disapproved, and re-configuring the generated report 104 based on the disapproval of the generated report 104.

According to examples, the method 2800 may further include publishing the generated report 104 based on the approval of the generated report 104 by selection of a publish option that is available on a user-interface display specific to the specified entity.

According to examples, the method 2800 may further include generating a further display of the generated report 104 and a plurality of reports 104 of similar line of businesses 106 compared to the line of business 106, and/or similar applications compared to the application 108.

Figure 29:
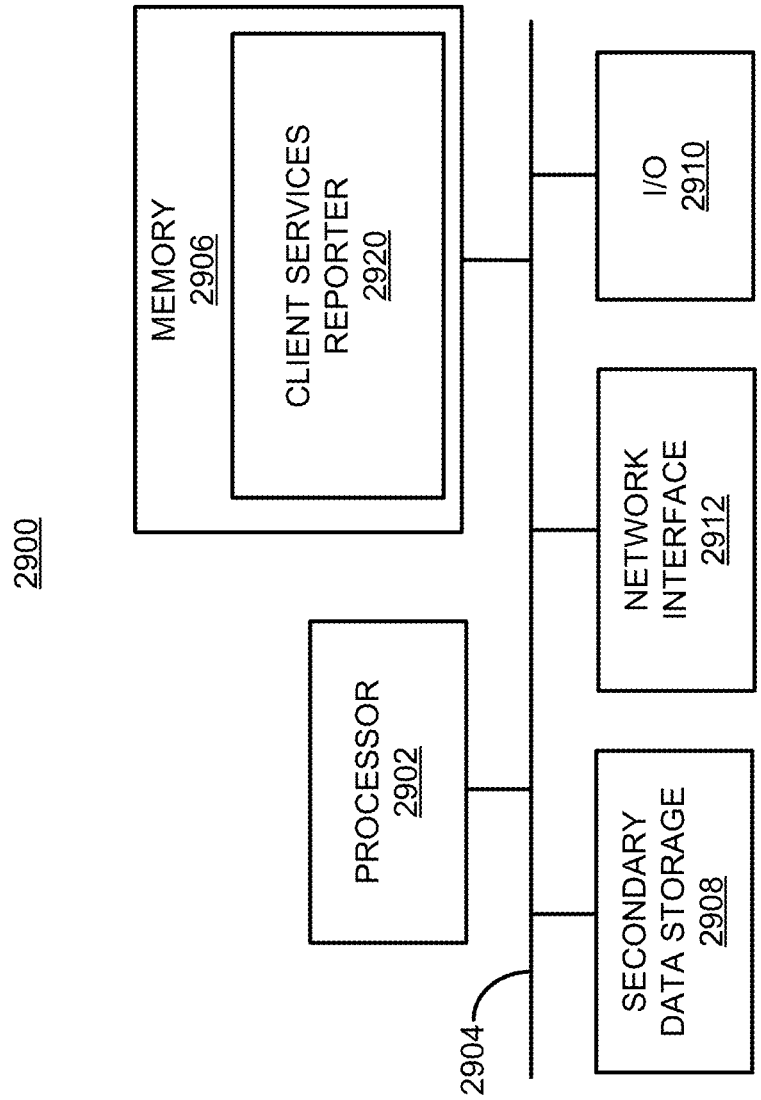
FIG. 29 illustrates a computer system, according to an example of the present disclosure.

FIG. 29 shows a computer system 2900 that may be used with the examples described herein. The computer system may represent a generic platform that includes components that may be in a server or another computer system. The computer system 2900 may be used as a platform for the system 100. The computer system 2900 may execute, by a processor (e.g., a single or multiple processors) or other hardware processing circuit, the methods, functions and other processes described herein. These methods, functions and other processes may be embodied as machine readable instructions stored on a computer readable medium, which may be non-transitory, such as hardware storage devices (e.g., RAM (random access memory), ROM (read only memory), EPROM (erasable, programmable ROM), EEPROM (electrically erasable, programmable ROM), hard drives, and flash memory).

The computer system 2900 may include a processor 2902 that may implement or execute machine readable instructions performing some or all of the methods, functions and other processes described herein. Commands and data from the processor 2902 may be communicated over a communication bus 2904. The computer system may also include a main memory 2906, such as a random access memory (RAM), where the machine readable instructions and data for the processor 2902 may reside during runtime, and a secondary data storage 2908, which may be non-volatile and stores machine readable instructions and data. The memory and data storage are examples of computer readable mediums. The memory 2906 may include a client services reporter 2920 including machine readable instructions residing in the memory 2906 during runtime and executed by the processor 2902. The client services reporter 2920 may include the elements of the client services reporting system 100 shown with reference to FIGS. 1-26.

The computer system 2900 may include an I/O device 2910, such as a keyboard, a mouse, a display, etc. The computer system may include a network interface 2912 for connecting to a network. Other known electronic components may be added or substituted in the computer system.

What has been described and illustrated herein is an example along with some of its variations. The terms, descriptions and figures used herein are set forth by way of illustration only and are not meant as limitations. Many variations are possible within the spirit and scope of the subject matter, which is intended to be defined by the following claims—and their equivalents—in which all terms are meant in their broadest reasonable sense unless otherwise indicated.

What is claimed is:

1. A client services reporting system comprising:
a configuration generator, executed by at least one hardware processor, to configure a report that is generated by
ascertaining a line of business related to the report,
ascertaining an application related to the line of business,
determining information related to a scope of services, a service model, a service level agreement description, a contract overview, and service management,
performing, based on the line of business and the application, a master setup of the report that includes the information related to the scope of services, the service model, the service level agreement description, the contract overview, and the service management, generating an executive summary, application maintenance metrics data, change management information, resourcing information, and business line performance information, and including, in the report, a field related to the executive summary that includes a summary of a status of a project, the application maintenance metrics data that include metrics data of the project associated with an application maintenance worktype, the change management information that includes information related to change requests, the resourcing information that includes information related to resources that are operating on the project, and the business line performance information that includes information based on metrics that define business performance, wherein the field includes metrics data that is sourced from an application outsourcing analytics engine;

a report confirmer, executed by the at least one hardware processor, to confirm the configuration of the report and the report by generating the report, ascertaining a confirmation status of the report, and submitting, based on the ascertained confirmation status of the report, the report for approval by a specified entity;

a report approver, executed by the at least one hardware processor, to ascertain, based on the submittal of the report for approval by the specified entity, whether the report is approved or disapproved, wherein the configuration generator is to further re-configure the report based on the disapproval of the generated report;

a report publisher, executed by the at least one hardware processor, to publish the generated report based on the approval of the generated report by selection of a publish option that is available on a user-interface display specific to the specified entity;

a report comparer, executed by the at least one hardware processor, to compare a plurality of parameters of the report to parameters of a report for a different line of business and a different application selected by the specified entity via the user-interface display, wherein the parameters are ascertained and compared based on predefined targets using a numeric comparison based technique, and generate a display of similarities and differences based on the comparison; and a non-transitory computer readable medium having stored thereon machine readable instructions that when executed cause the at least one hardware processor to determine a metric related to service level agreement compliance based on a ratio of met conditions to missed conditions, include, in the generated report, the metric related to the service level agreement, and control, based on the generated report, an operation associated with the line of business.

2. The client services reporting system according to claim 1, wherein the configuration generator is to perform, based on the line of business and the application, the master setup of the report by performing, based on the line of business and the application, the master setup of the report to include a publishing interval of the report.

3. The client services reporting system according to claim 1, wherein the configuration generator is to specify the scope of services, the service model, the service level agreement description, the contract overview, and the service management as mandatory fields of the report that are unchangeable after completion of the configuration of the report.

4. The client services reporting system according to claim 1, wherein the configuration generator is to configure the report that is generated by including the application maintenance metrics data that includes metrics derived from at least one of incident management, problem management, work request management, or application management.

5. The client services reporting system according to claim 1, wherein the configuration generator is to configure the report that is generated by including the change management information that includes lower and upper control limits related to a graph included in the report.

6. The client services reporting system according to claim 1, wherein the report confirmer is to confirm the configuration of the report and the report by submitting, based on the ascertained confirmation status of the report, the report for approval by the specified entity that includes the authority to approve or reject the report.

7. The client services reporting system according to claim 1, wherein the configuration generator is to re-configure the entire report based on the disapproval of the report.

8. The client services reporting system according to claim 1, wherein the machine readable instructions that when executed further cause the at least one hardware processor to:

lock data associated with the generated report for a period associated with the publication of the generated report.

9. A computer implemented method for client services reporting, the method comprising:

ascertaining a line of business related to a report that is to be generated;

ascertaining an application related to the line of business;

determining information related to a scope of services, a service model, a service level agreement description, a contract overview, and service management;

performing, based on the line of business and the application, a master setup of the report that includes information related to the scope of services, the service model, the service level agreement description, the contract overview, and the service management;

generating an executive summary, application maintenance metrics data, change management information, resourcing information, and business line performance information;

including, in the report, a field related to the executive summary that includes a summary of a status of a project, the application maintenance metrics data that include metrics data of the project associated with an application maintenance worktype, the change management information that includes information related to change requests, the resourcing information that includes information related to resources that are operating on the project, and the business line performance information that includes information based on metrics that define business performance, wherein the field includes metrics data that is sourced from an application outsourcing analytics engine;

generating the report based on the master setup of the report and the field related to the executive summary, the application maintenance metrics data, the change management information, the resourcing information, and the business line performance information;

ascertaining a confirmation status of the generated report;
submitting, based on the ascertained confirmation status of the generated report, the generated report for approval by a specified entity;
ascertaining, based on the submittal of the generated report for approval by the specified entity, whether the generated report is approved or disapproved;
re-configuring the report based upon the disapproval of the generated report;
publishing the generated report based on the approval of the generated report by selection of a publish option that is available on a user-interface display specific to the specified entity;
comparing a plurality of parameters of the report to parameters of a report for a different line of business and a different application selected by the specified entity via the user-interface display, wherein the parameters are ascertained and compared based on predefined targets using a numeric comparison based technique;
generating a display of similarities and differences based on the comparison;
determining a metric related to service level agreement compliance based on a ratio of met conditions to missed conditions;
including, in the generated report, the metric related to the service level agreement; and
controlling, based on the generated report, an operation associated with the line of business.

10. The method for client services reporting according to claim 9, wherein performing, based on the line of business and the application, the master setup of the report further comprises:
performing, based on the line of business and the application, the master setup of the report to include a publishing interval of the report.

11. The method for client services reporting according to claim 9, wherein the master setup includes information related to the scope of services, the service model, the service level agreement description, the contract overview, and service management as mandatory fields of the report that are unchangeable after completion of the configuration of the report.

12. The method for client services reporting according to claim 9, wherein the application maintenance metrics data includes metrics derived from at least one of incident management, problem management, work request management, or application management.

13. The method for client services reporting according to claim 9, wherein the change management information includes lower and upper control limits related to a graph included in the report.

14. A non-transitory computer readable medium having stored thereon machine readable instructions for client services reporting, the machine readable instructions when executed cause a computer system to:
ascertain a line of business related to a report that is to be generated;
ascertain an application related to the line of business;
determine information related to a scope of services, a service model, a service level agreement description, a contract overview, and service management;
perform, based on the line of business and the application, a master setup of the report that includes the information related to the scope of services, the service model, the service level agreement description, the contract overview, and the service management;
generate an executive summary, application maintenance metrics data, change management information, resourcing information, and business line performance information;
include, in the report, a field related to the executive summary that includes a summary of a status of a project, the application maintenance metrics data that include metrics data of the project associated with an application maintenance worktype, the change management information that includes information related to change requests, the resourcing information that includes information related to resources that are operating on the project, and the business line performance information that includes information based on metrics that define business performance, wherein the field includes metrics data that is sourced from an application outsourcing analytics engine;
generate the report based on the master setup of the report and the field related to the executive summary, the application maintenance metrics data, the change management information, the resourcing information, and the business line performance information;
ascertain a confirmation status of the generated report;
submit, based on the ascertained confirmation status of the generated report, the generated report for approval by a specified entity;
ascertain, based on the submittal of the generated report for approval by the specified entity, whether the generated report is approved or disapproved;
re-configure the report based upon the disapproval of the generated report;
publish the generated report based on the approval of the generated report by selection of a publish option that is available on a user-interface display specific to the specified entity;
compare a plurality of parameters of the generated report to parameters of a report for at least one of a different line of business and a different application selected by the specified entity via the user interface display, wherein the parameters are ascertained and compared based on predefined targets using a numeric comparison based technique;
generate a display of similarities and differences based on the comparison;
determine a metric related to service level agreement compliance based on a ratio of met conditions to missed conditions;
include, in the generated report, the metric related to the service level agreement; and
control, based on the generated report, an operation associated with the line of business.

15. The non-transitory computer readable medium according to claim 14, further comprising machine readable instructions that when executed further cause the computer system to:
generate a further display of the generated report and a plurality of reports of at least one of similar line of businesses compared to the line of business, or similar applications compared to the application.

* * * * *